(12) United States Patent
Jones et al.

(10) Patent No.: US 12,065,562 B2
(45) Date of Patent: Aug. 20, 2024

(54) METHOD OF TUNING PHYSICAL PROPERTIES OF THERMOSETS

(71) Applicant: National Technology & Engineering Solutions of Sandia, LLC, Albuquerque, NM (US)

(72) Inventors: Brad Howard Jones, Albuquerque, NM (US); Samuel Leguizamon, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/577,111

(22) Filed: Jan. 17, 2022

(65) Prior Publication Data

US 2023/0227646 A1 Jul. 20, 2023

(51) Int. Cl.
*C08L 63/00* (2006.01)

(52) U.S. Cl.
CPC ......... *C08L 63/00* (2013.01); *C08L 2205/035* (2013.01)

(58) Field of Classification Search
CPC ............... C08L 63/00; C08L 2205/03
USPC .......................................... 528/407
See application file for complete search history.

(56) References Cited

U.S. PATENT DOCUMENTS

| 4,107,116 | A | * | 8/1978 | Riew | C08G 59/40 |
| | | | | | 525/122 |
| 4,680,076 | A | * | 7/1987 | Bard | C08L 63/00 |
| | | | | | 523/435 |
| 2014/0357802 | A1 | * | 12/2014 | Aou | C08F 36/06 |
| | | | | | 525/329.3 |
| 2020/0181391 | A1 | * | 6/2020 | Sista | C08G 59/245 |

(Continued)

FOREIGN PATENT DOCUMENTS

| JP | 06179760 A | * | 6/1994 | ................ C08J 5/24 |
| WO | WO-2019189226 A1 | * | 10/2019 | ............ C08F 216/38 |

OTHER PUBLICATIONS

Huntsman "JEFFAMINE® Polyetheramine", 2021 (Year: 2021).*

(Continued)

*Primary Examiner* — David T Karst
(74) *Attorney, Agent, or Firm* — Kevin W. Bieg

(57) ABSTRACT

Polymerization-induced phase separation enables fine control over thermoset network morphologies, yielding heterogeneous structures with domain sizes tunable over 1-100 nm. However, the controlled chain-growth polymerization techniques exclusively employed to regulate morphology at these length scales are unsuitable for most thermoset materials typically formed through step-growth mechanisms. By employing binary mixtures in place of the classic constituents of phase-separating thermosets—resin, curing agent, and secondary polymer—facile tunability over morphology can be achieved through a single compositional parameter. Indeed, this method yields morphologies spanning nanoscale to macro-scale, controlled by the relative reactivities (Continued)

and thermodynamic compatibility of the network components. Due to the connection between chain dynamics and microstructure in these materials, the tunable morphology enables exquisite control over glass transition and other physical and mechanical properties.

22 Claims, 16 Drawing Sheets

(56) References Cited

U.S. PATENT DOCUMENTS

2020/0385512 A1* 12/2020 Fukuda ................ C08J 5/04
2021/0040304 A1* 2/2021 Tateno ................ C08L 63/00

OTHER PUBLICATIONS

Mihoichi et al., JP 06-179760 A machine translation in English, Jun. 28, 1994 (Year: 1994).*

Leguizamon, S. C. et al., "Polymerization-Induced Phase Separation in Rubber-Toughened Amine-Cured Epoxy Resins: Tuning Morphology from the Nano- to Macro-scale," Macromolecules, 2021, vol. 54, pp. 7796-7807.

Saba, S. A. et al., "Tricontinuous Nanostructured Polymers via Polymerization-Induced Microphase Separation," ACS Macro Letters, 2017, vol. 6, pp. 1232-1236.

Seo, M. and Hillmyer, M. A., "Reticulated Nanoporous Polymers by Controlled Polymerization-Induced Microphase Separation," Science, 2012, vol. 336, pp. 1422-1425.

Masser, K. A. et al., "Relating Structure and Chain Dynamics to Ballistic Performance in Transparent Epoxy Networks Exhibiting Nanometer Scale Heterogeneity," Polymer, 2015, vol. 58, pp. 96-106.

Masser, K. A. et al., "Dynamic Heterogeneity in Epoxy Networks for Protection Applications," Journal of Applied Polymer Science, 2016, vol. 133, 11 pages.

Ma, J. et al., "Study of Epoxy Toughened by in Situ Formed Rubber Nanoparticles," Journal of Applied Polymer Science, 2008, vol. 110, pp. 304-312.

Hsu, Y-G. et al., "Properties of Epoxy-Amine Networks Containing Nanostructured Ether-Crosslinked Domains," Materials Chemistry and Physics, 2012, vol. 132, pp. 688-702.

Zhang, C. and Zheng, S., "Morphology and Fracture Toughness of Nanostructured Epoxy Resin Containing Amino-Terminated Poly-(propylene oxide)," Journal of Macromolecular Science, Part B: Physics, 2010, vol. 49, pp. 574-591.

Romo-Uribe, A. et al., "PDMS Nanodomains in DGEBA Epoxy Induce High Flexibility and Toughness," Polymer-Plastics Technology and Engineering, 2017, vol. 56, pp. 96-107.

* cited by examiner

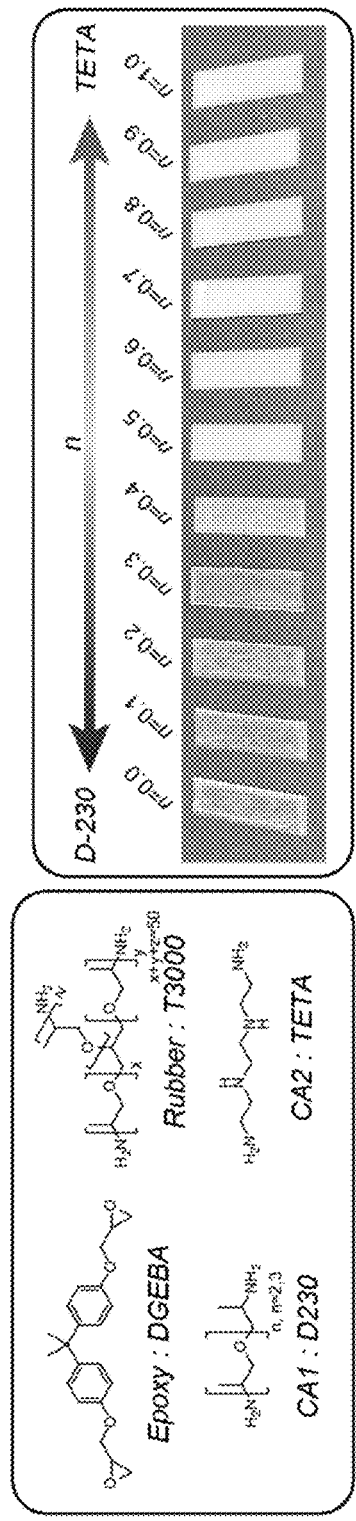
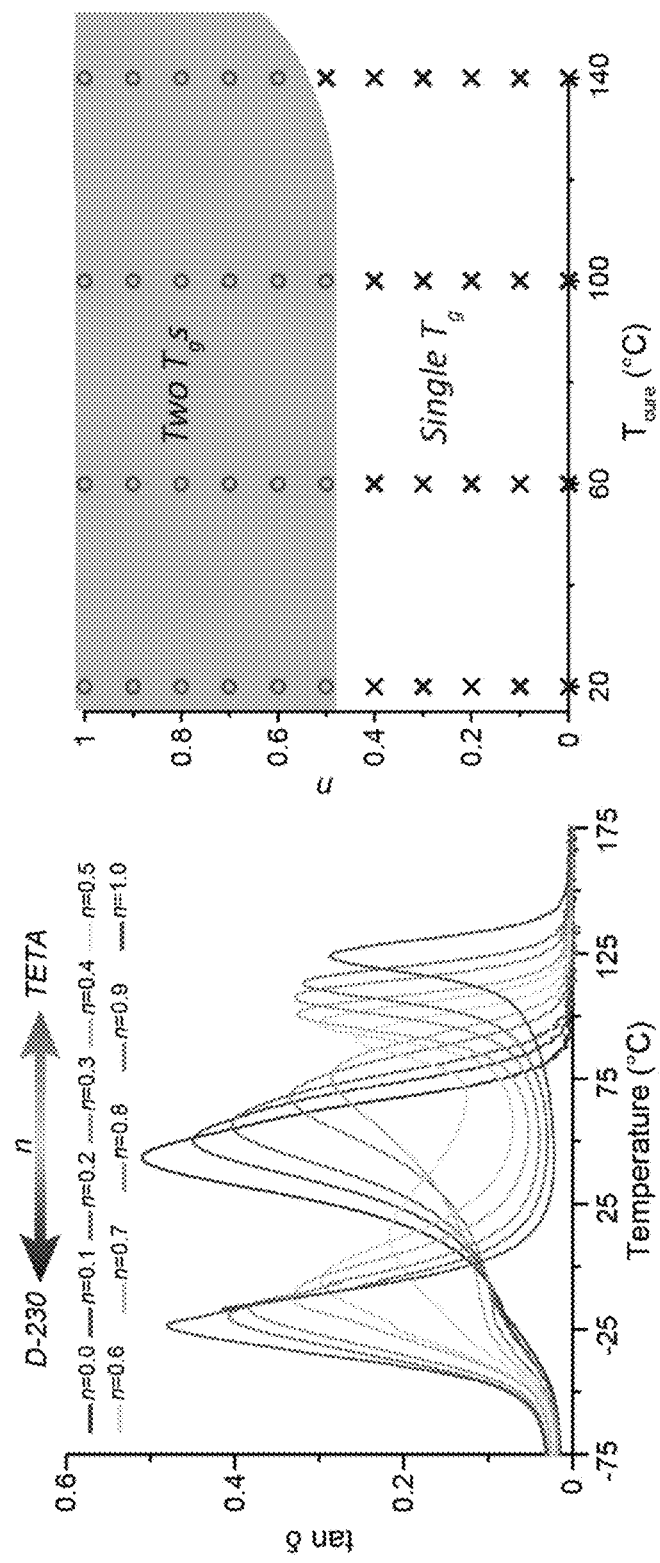
FIG. 1(a)
FIG. 1(b)
FIG. 1(c)
FIG. 1(d)

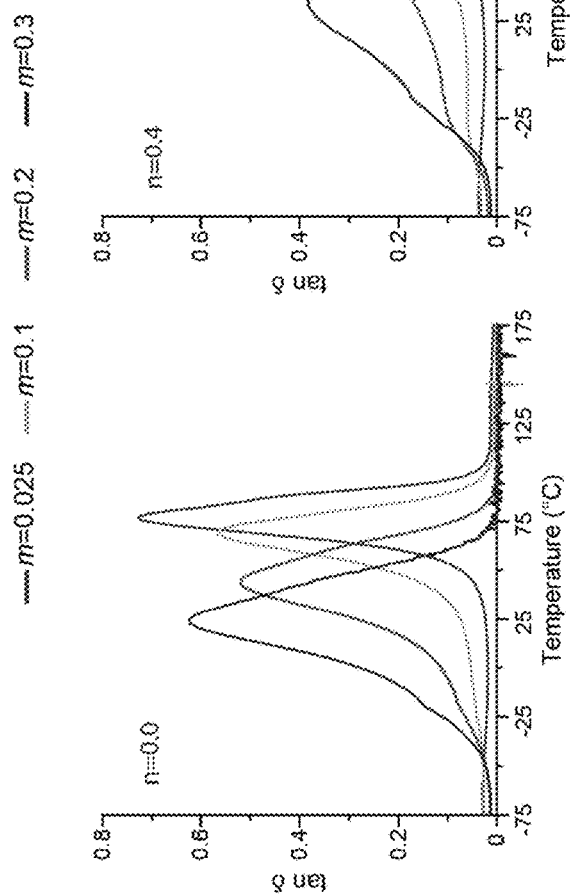
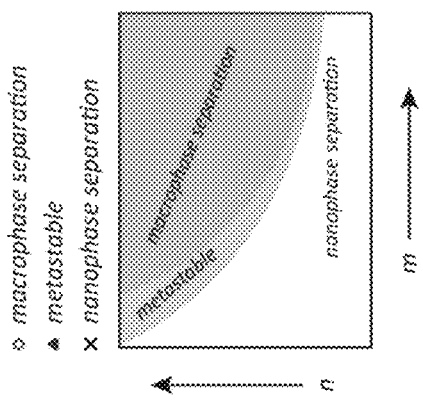
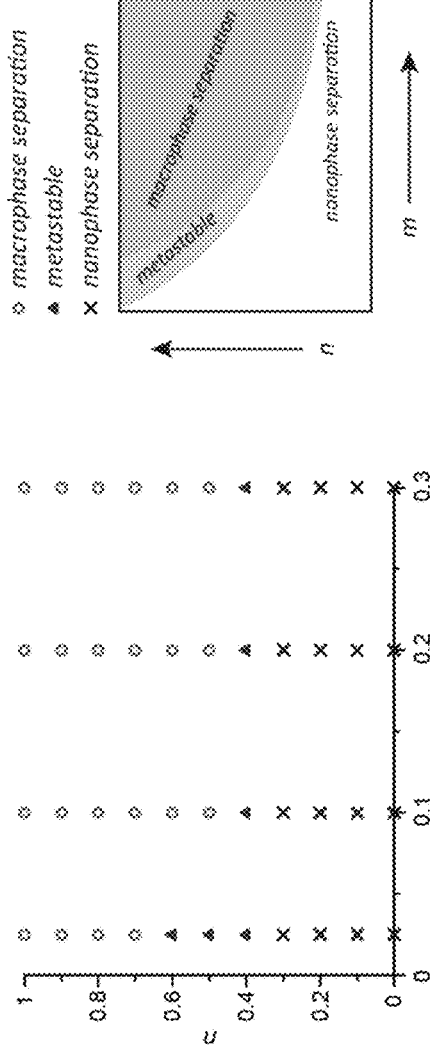
FIG. 2(a) FIG. 2(b) FIG. 2(c) FIG. 2(d)

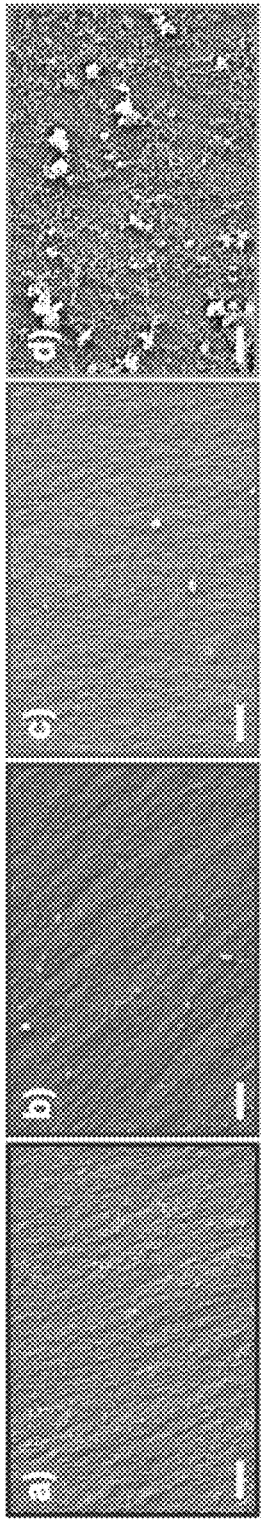
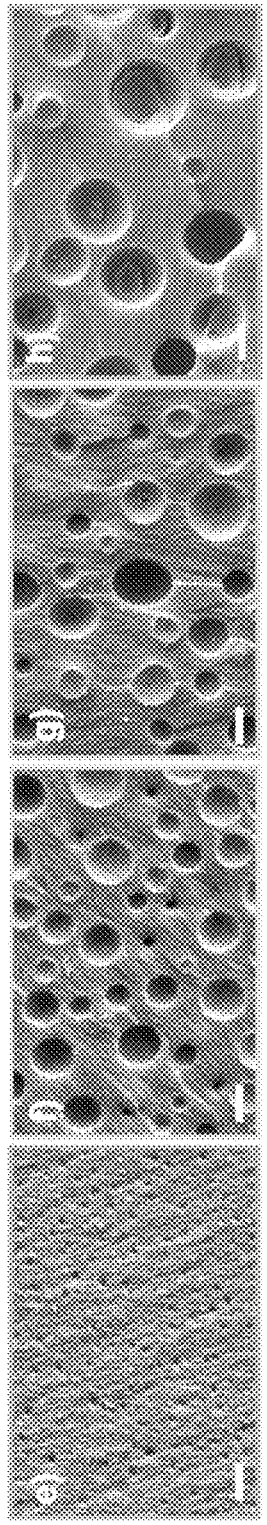
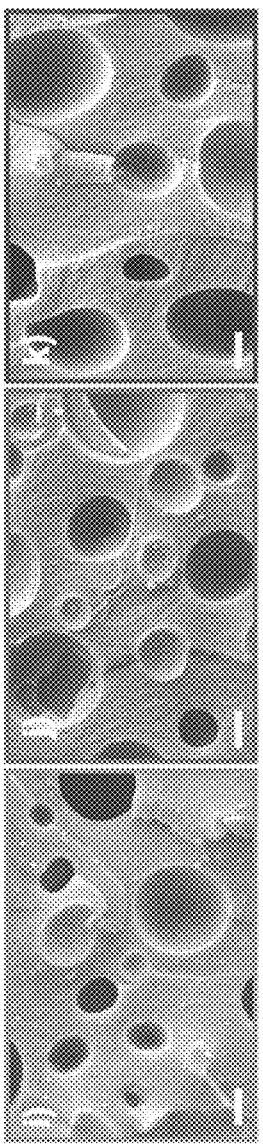

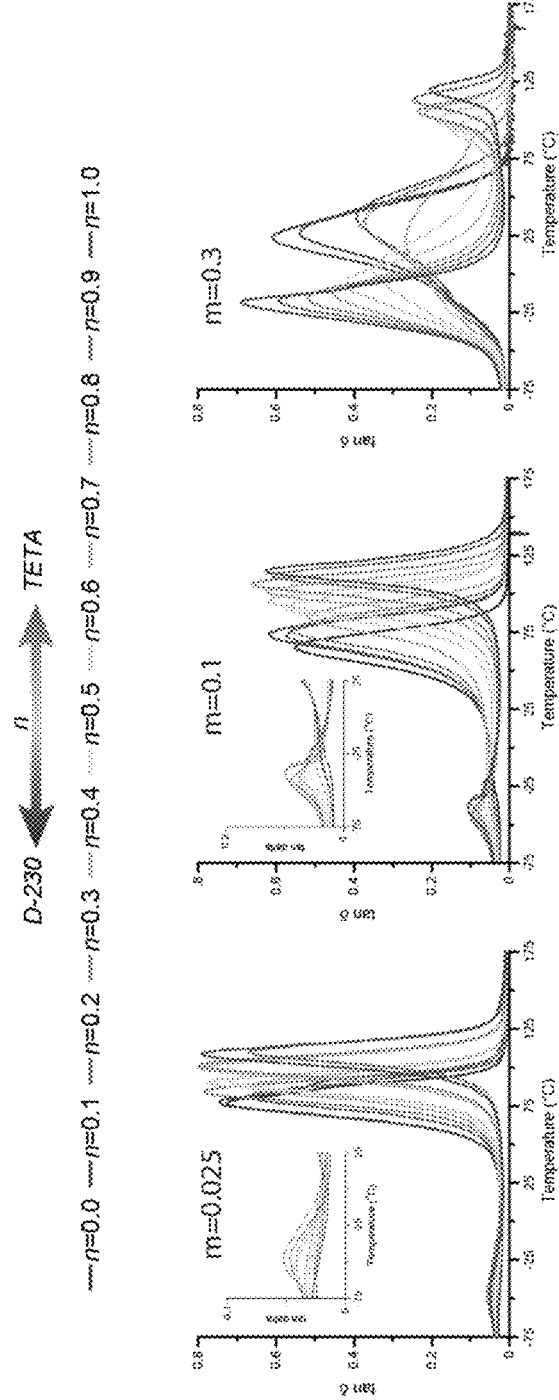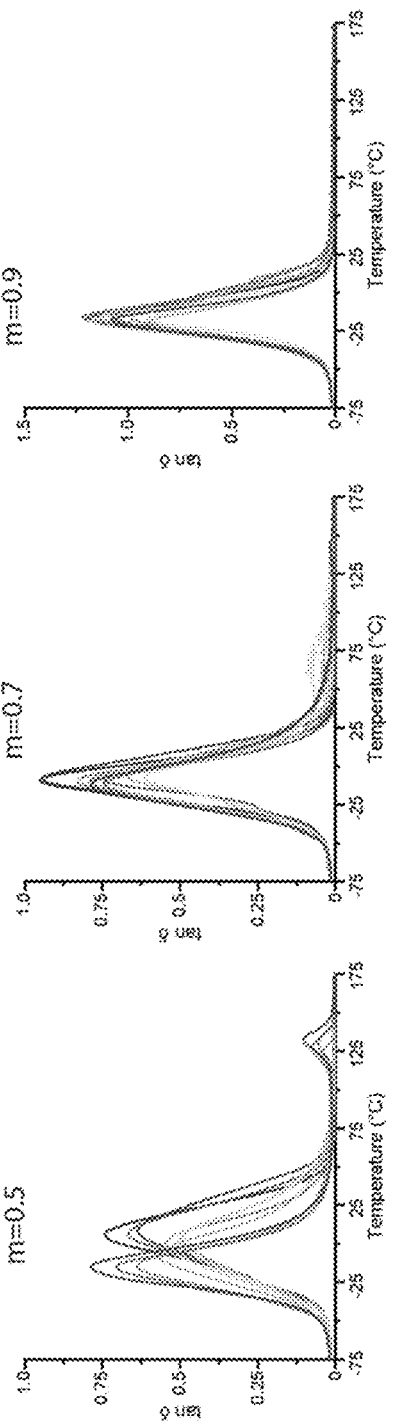
FIG. 6(a) FIG. 6(b) FIG. 6(c) FIG. 6(d) FIG. 6(e) FIG. 6(f)

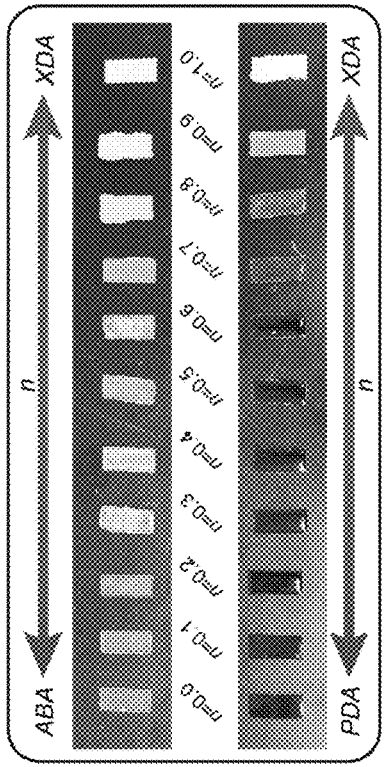
FIG. 8(a)
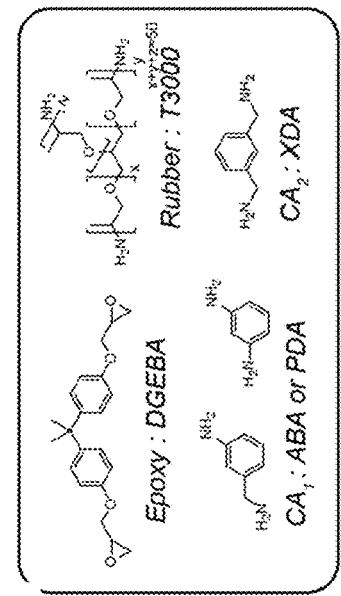
FIG. 8(b)
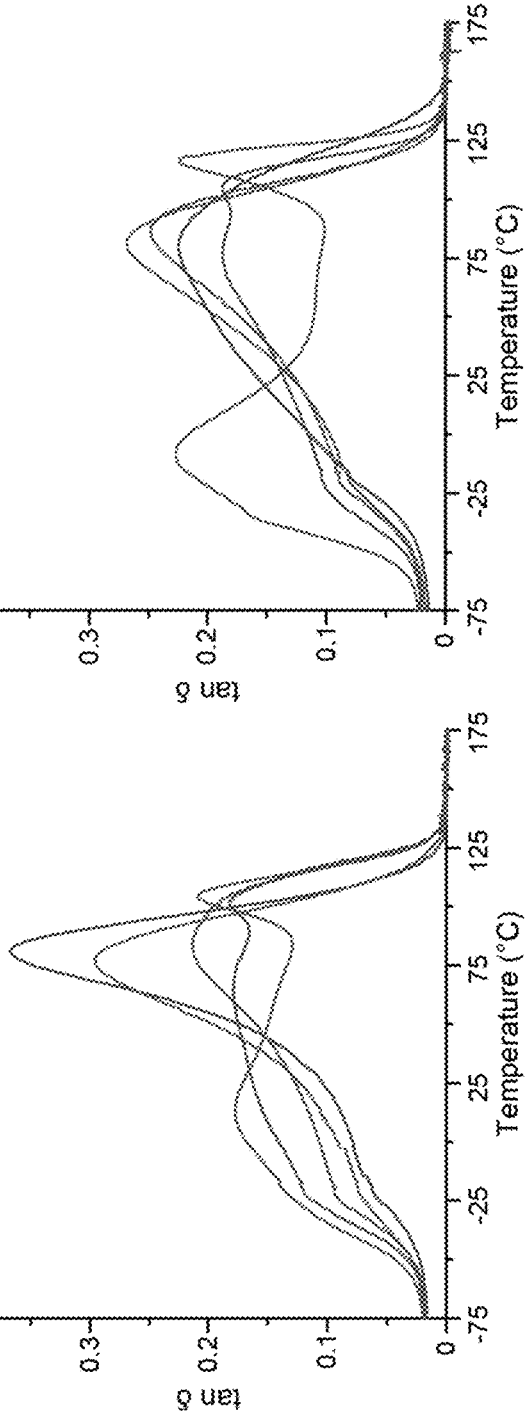
FIG. 8(c)
FIG. 8(d)

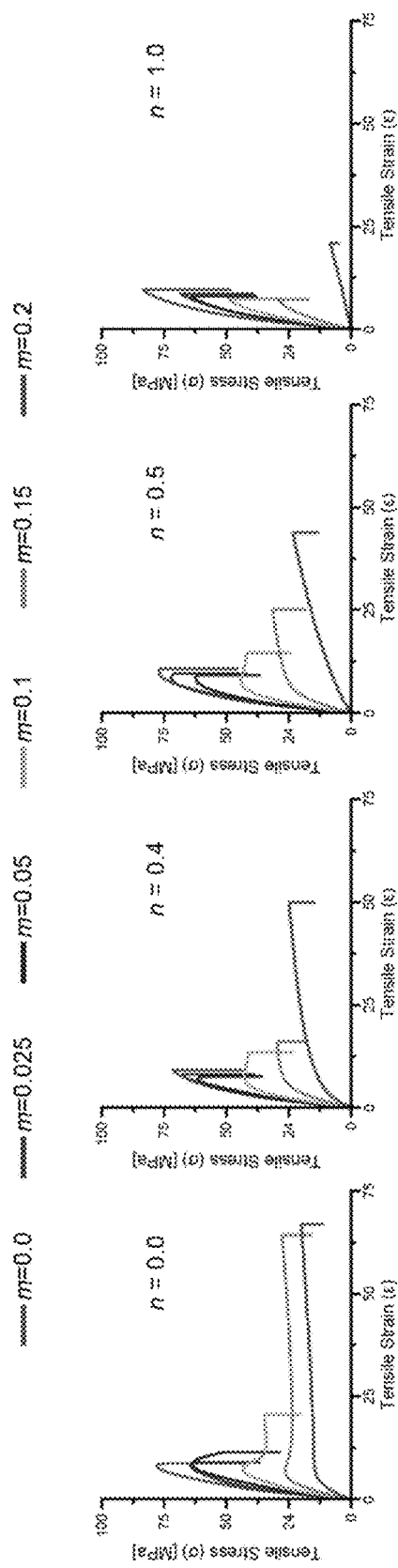
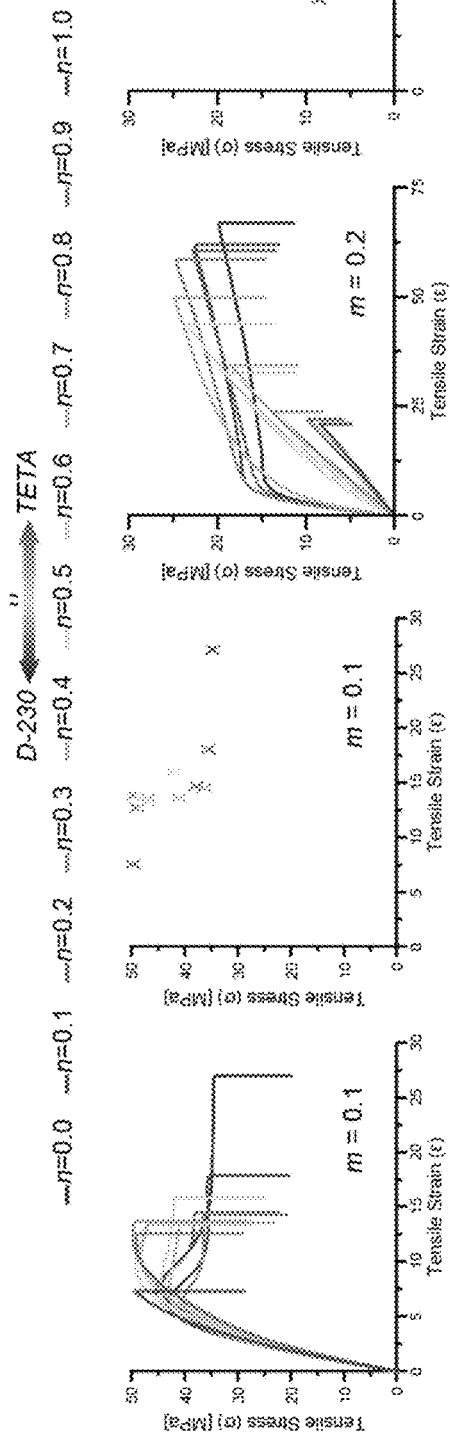
FIG. 11(a) — FIG. 11(h)

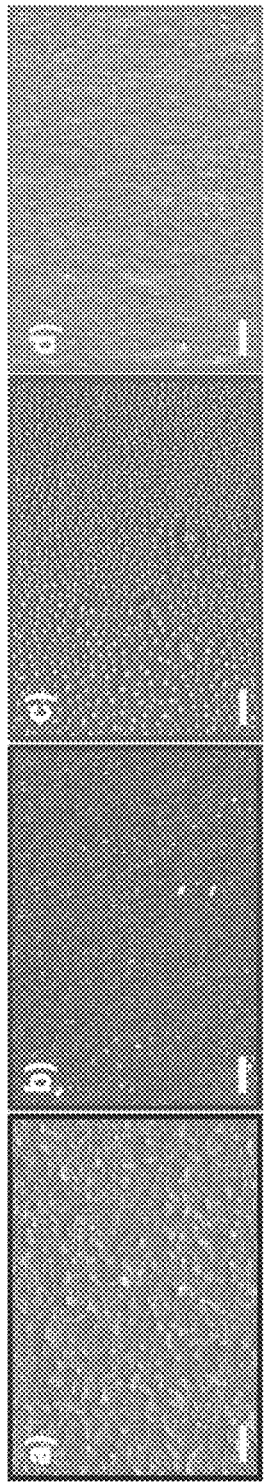
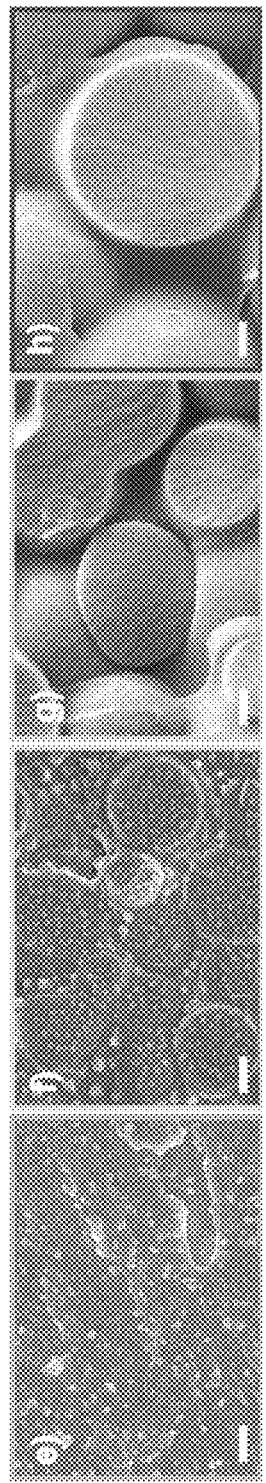
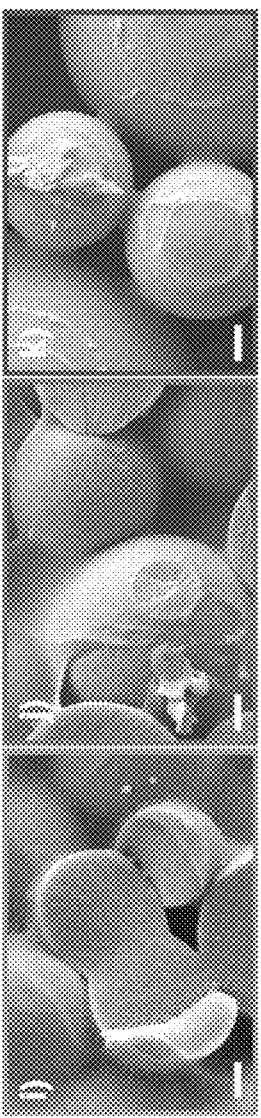
FIG. 12(a) FIG. 12(b) FIG. 12(c) FIG. 12(d)
FIG. 12(e) FIG. 12(f) FIG. 12(g) FIG. 12(h)
FIG. 12(i) FIG. 12(j) FIG. 12(k)

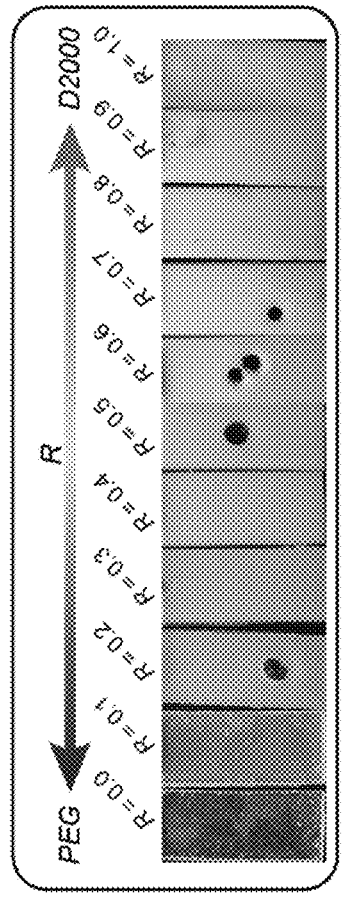
FIG. 14(a)
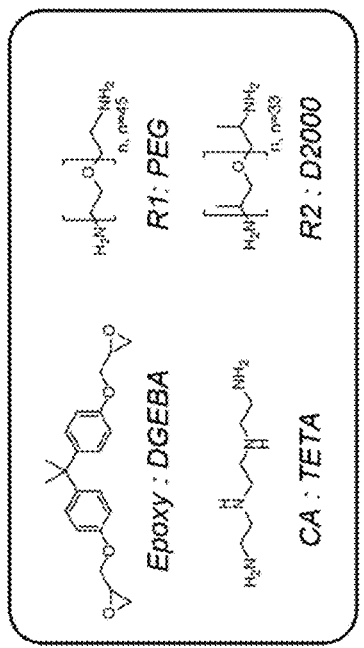
FIG. 14(b)
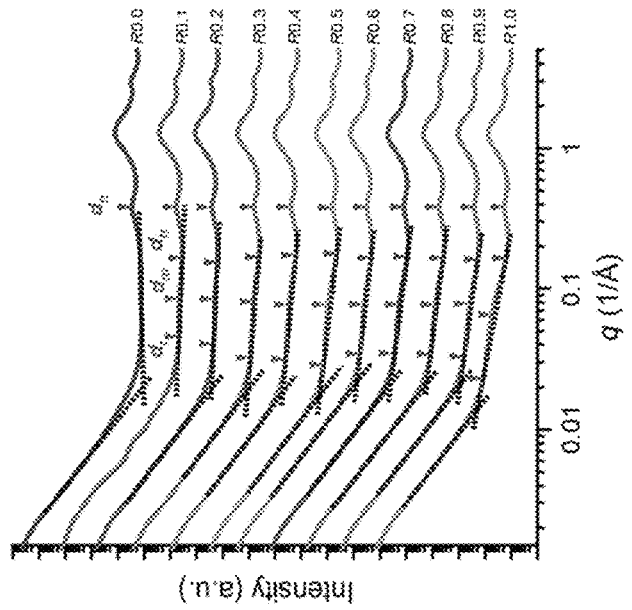
FIG. 14(c)
FIG. 14(d)

METHOD OF TUNING PHYSICAL PROPERTIES OF THERMOSETS

STATEMENT OF GOVERNMENT INTEREST

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosure is submitted under 35 U.S.C. 102(b)(1)(A): Samuel C. Leguizamon, Jackson Powers, Juhong Ahn, Sara Dickens, Sangwoo Lee, and Brad H. Jones, "Polymerization-Induced Phase Separation in Rubber-Toughened Amine-Cured Epoxy Resins: Tuning Morphology from the Nano- to Macro-scale," *Macromolecules* 54(17), 7796 (2021), which is incorporated herein by reference. The subject matter of this disclosure was conceived of or invented by the inventors named in this application.

FIELD OF THE INVENTION

The present invention relates to thermosetting polymers and, in particular, to a method of tuning the physical properties of thermosets.

BACKGROUND OF THE INVENTION

Polymerization-induced phase separation (PIPS), the spontaneous segregation of otherwise miscible components upon an increase in the molecular weight of at least one of the components, has offered a distinct pathway for generating thermoset polymers with well-defined nanostructures and microstructures. Indeed, various morphologies have been produced with the PIPS strategy including co-continuous, isolated or fused globular structures, lamellae, and cylinders, with applications for membranes, sorbents, functional coatings, and UV-cured dental materials. See S. A. Saba et al., *ACS Macro Lett.* 6(11), 1232 (2017); C. E. Hoppe et al., *Macromolecules* 35(16), 6324 (2002); M. Okada et al., *Macromolecules* 28(6), 1795 (1995); F. Meng et al., *Macromolecules* 39(2), 711 (2006); Z. Dong et al., *Nat. Commun.* 12(1), 247 (2021); R. Yu et al., *Macromolecules* 45(22), 9155 (2012); J. Oh and A. D. Rey, *Comput. Theor. Polym. Sci.* 11(3), 205 (2001); M. A. Hillmyer et al., *J. Am. Chem. Soc.* 119(11), 2749 (1997); R. Motokawa et al., *Polym. J.* 39(12), 1312 (2007); M. W. Schulze et al., *Nano Lett.* 14(1), 122 (2014); L. Chen et al., *Macromolecules* 42(16), 6075 (2009); S. C. Price et al., *Macromolecules* 46(18), 7332 (2013); G.-P. Hao et al., *J. Am. Chem. Soc.* 133(29), 11378 (2011); G. Wang et al., *Langmuir* 36(36), 10794 (2020); Y. Tang et al., *Opt. Lett.* 45(10), 2918 (2020); D. C. Hoekstra et al., *Angew. Chem. Int. Ed.*, 60(19), 10935 (2021); C. R. Szczepanski et al., *Polymer* 53(21), 4694 (2012); and C. Bracho-Troconis et al., *Compend. Contin. Educ. Dent.* 31(2), 5 (2010). Owing to their versatile nature, block copolymers are well suited for PIPS in thermosets where the molecular weight and volume fraction of polymer blocks regulate domain size and morphology of the phase-separated systems. Early examples of block copolymer-driven PIPS employed amphiphilic copolymers blended with epoxy systems to yield highly ordered domains down to tens of nanometers. See M. A. Hillmyer et al., *J. Am. Chem. Soc.* 119(11), 2749 (1997); P. M. Lipic et al., *J. Am. Chem. Soc.* 120(35), 8963 (1998); H. Garate et al., Miscibility, Phase Separation, and Mechanism of Phase Separation of Epoxy/Block-Copolymer Blends, In *Handbook of Epoxy Blends*, Parameswaranpillai, J., Hameed, N., Pionteck, J., Woo, E. M., Eds. Springer International Publishing: Cham, pp 841-881 (2017); and Y. Meng and X. Zhang, Nanostructured Epoxy Composites, In *Micro-and Nanostructured Epoxy/Rubber Blends*, pp 53-72 (2014). However, the lack of a covalent bond connecting the secondary polymer and the thermoset matrix in these early works resulted in the expulsion of the copolymers from the matrix and set a lower bound for domain size (e.g., above~10 nm). See J. Lequieu and A. J. D. Magenau, *Polym. Chem.* 12(1), 12 (2012). Conversely, reactive block copolymers capable of forming cross-links in situ ensure that the segregating phases are covalently linked, thereby providing a convenient handle to tune domain size through the relative volume fraction of the segregating components. See M. W. Schulze and M. A. Hillmyer, *Macromolecules* 50(3), 997 (2017); and V. Muralidharan and C.-Y. Hui, *Macromol. Rapid Commun.* 25(16), 1487 (2004). In perhaps the most pertinent example, Seo and Hillmyer prepared polylactide (PLA) terminated with a trithiocarbonate chain transfer agent to serve as initiator for the subsequent in situ polymerization and PIPS of poly(styrene-co-divinylbenzene) (PS-DVB), leading ultimately to a bicontinuous array of 4-10 nm PLA and PS-DVB domains. See M. Seo and M. A. Hillmyer, *Science* 336(6087), 1422 (2012). Of note, the size of domains within the thermoset material could be tuned by several factors, such as the molecular weight of the macro-initiator or the stoichiometry of the crosslinking mixture. See S. A. Saba et al., *ACS Macro Lett.* 6(11), 1232 (2017); M. W. Schulze et al., *Nano Lett.* 14(1), 122 (2014); and M. W. Schulze and M. A. Hillmyer, *Macromolecules* 50(3), 997 (2017).

Given their thermal, chemical, and/or mechanical stability, thermosetting polymers (e.g., epoxy resins) are used in various high-performance applications. Nevertheless, thermosetting polymers are often hampered by their brittle nature, poor resistance to crack initiation, and low fracture toughness as a result of their rigid repeat units and high crosslink densities. See J. Wang et al., *Prog. Polym. Sci.* 98, 101160 (2019). PIPS employing secondary polymers (e.g., rubbers) in thermosetting systems has emerged as a promising toughening technique—indeed, it has been employed in commercial applications of thermosets over recent decades—for generating dynamically heterogenous polymeric materials able to dissipate energy and arrest crack propagation. See J. Wang et al., *Prog. Polym. Sci.* 98, 101160 (2019); V. Rebizant et al., *Macromolecules* 37(21), 8017 (2014); B. J. P. Jansen et al., *Macromolecules* 34(12), 3998 (2001); W. Chonkaew and N. Sombatsompop, *J. Appl. Polym. Sci.* 125(1), 361 (2012); Z. Heng et al., *Chem. Eng. J.* 360, 542 (2019); L.-Z. Guan et al., *Polym. Compos.* 36(5), 785 (2015); and S.-A. Xu and X.-X. Song, Introduction to Rubber toughened Epoxy Polymers, In *Handbook of Epoxy Blends*, Parameswaranpillai, J., Hameed, N., Pionteck, J., Woo, E. M., Eds. Springer International Publishing: Cham, pp 1-26 (2015). Importantly, studies have demonstrated that the toughening effectiveness of compounds dispersed in thermoset matrices is enhanced as the domain size approaches the nanoscale. See Q.-H. Le et al., *Polym.* 51(21), 4867 (2010); L.-C. Tang et al., *Mater. Chem. Phys.* 141(1), 333 (2013); C. B. Bucknall and D. R. Paul, *Polymer* 54(1), 320 (2013); K. A. Masser et al., *Polymer* 103, 337 (2016); and Q. Meng et al., *J. Mater. Res.* 29(5), 665 (2014).

However, conventional methods employing secondary homopolymers do not afford the broad control over morphology that can be obtained with the use of block copolymers. While block copolymers have been demonstrated as rubber-toughening agents, whereby one block acts as the secondary polymer, the onerous controlled polymerization techniques used to synthesize block copolymers limit their accessibility. See V. Rebizant et al., *Macromolecules* 37(21), 8017 (2014); W. Chonkaew and N. Sombatsompop, *J. Appl. Polym. Sci.* 125(1), 361 (2012); and S.-A. Xu and X.-X. Song, Introduction to Rubber toughened Epoxy Polymers, In *Handbook of Epoxy Blends*, Parameswaranpillai, J., Hameed, N., Pionteck, J., Woo, E. M., Eds. Springer International Publishing: Cham, pp 1-26 (2015). Rather, a majority of application-driven thermosets utilize a step-growth polymerization mechanism with multiple reactive species, where, in practice, the enforcement of a covalent linkage between the thermoset and the secondary polymer at the onset of phase separation can be difficult to achieve—convoluting efforts to regulate morphology at the nanoscale in contrast to the recent examples with chain-growth polymerizations (step-growth polymerization refers to a type of polymerization mechanism in which bi-functional or multi-functional monomers react to form first dimers, then trimers, longer oligomers and eventually long chain polymers). See S. A. Saba et al., *ACS Macro Lett.* 6(11), 1232 (2017); and M. Seo and M. A. Hillmyer, *Science* 336(6087), 1422 (2012).

In recent studies, Masser et al. investigated PIPS in epoxy systems by simultaneously employing two disparate, reactive curing agents: flexible Jeffamines (commercial amine-terminated polyethers) and a rigid cycloaliphatic diamine (4,4-diaminodicyclohexylmethane (PACM)). See K. A. Masser et al., *Polymer* 58, 96 (2015); and K. A. Masser et al., *J. Appl. Polym. Sci.* 133(45), 43566 (2016). Whereas Jeffamines of low molecular weight (200-400 g/mol) produced transparent, homogenous networks regardless of PACM content, PIPS was observed in networks incorporating high molecular weight Jeffamines (>2000 g/mol) leading to nano-phase separated morphologies characterized by a single, yet broad, glass transition. Further increasing the Jeffamine molecular weight to 4000 g/mol yielded opaque, macro-phase separated samples, characterized by two distinct glass transitions corresponding to the disparate Jeffamine and epoxy-PACM domains. Interestingly, this work resembles PIPS with block copolymers, in which the reaction of PACM with epoxy forms one block that is incompatible with the Jeffamine rubbery block, thus growth of the epoxy-PACM network induces phase separation, with the phase separated morphology depending critically on the size of the incompatible Jeffamine block. Importantly, the work by Masser et al. suggests PIPS in step-growth thermosets can be broadly controlled over length scales spanning the nanoscale to the macroscale by balancing the chemical incompatibility of small molecule curing agents with a secondary polymer and its molecular weight or mass fraction. While there have been other sporadic reports of nanoscale morphologies derived from PIPS in step-growth thermosets, none have demonstrated a significant level of control over morphology. See J. Ma et al., *J. Appl. Polym. Sci.* 110(1), 304 (2008); Y.-G. Hsu et al., *Mater. Chem. Phys.* 132(2), 688 (2012); C. Zhang and S. Zheng, *J. Macromol. Sci. B* 49(3), 574 (2010); and A. Romo-Uribe et al., *Polym. Plast. Technol. Eng.* 56(1), 96 (2017).

SUMMARY OF THE INVENTION

The present invention is directed to a method of forming multi-phase thermosets wherein a binary mixture is employed to simultaneously favor disparate phase separation processes and enable morphology to be broadly tuned simply through a single compositional parameter. These thermosetting polymers undergo PIPS at length scales ranging from macromolecular dimensions, ca. 1-20 nm, up to 1-10 μm. PIPS can be tuned between the nano-and macroscale, with an intermediate, metastable morphology by adjusting the composition of the binary mixture, which modulates the chemical compatibility of the separating phases or the degree to which they are covalently interconnected. This facile control over PIPS and the resulting morphology enables unprecedented tuning of physical properties, such as glass transition and tensile behavior, in these thermoset materials, and thus enables systematic optimization of performance in such regards. Toughness can be optimized without sacrificing modulus or ultimate tensile strength, in contrast to conventional approaches to rubber toughening. The basic principle of substituting a single component of the polymerizing mixture with two components judiciously selected to provide disparate outcomes can be broadly generalized to the typical components of epoxies and other step-growth thermosets. Tunable PIPS can be employed to improve the performance of thermosets beyond conventional paradigms and unlock new applications for these materials.

BRIEF DESCRIPTION OF THE DRAWINGS

The detailed description will refer to the following drawings, wherein like elements are referred to by like numbers.

FIGS. 1(a)-1(d) show aspects of tunable PIPS in an epoxy thermoset using a binary curing agent (CA) mixture and a rubbery polymer. FIG. 1(a) illustrates the chemical structures of DGEBA, T3000, D230, and TETA. FIG. 1(b) shows images of plaques made by varying n (n=[—NH—]$_{0,TETA}$/([—NH—]$_{0,TETA}$+[—NH—]$_{0,D230}$) at constant m=0.2 (m=[—NH—]$_{0,T3000}$/[—NH—]$_{0,total}$) cured at 60° C. FIG. 1(c) is a graph of the corresponding loss tangent vs. temperature. FIG. 1(d) is a phase diagram showing the nature of glass transition as a function of cure temperature and n.

FIG. 2(a) is a graph of loss tangent vs. temperature for DGEBA-T3000-TETA-D230 cured at 60° C. with variable rubber content (m) and constant curing agent composition with n=0. FIG. 2(b) is a similar graph with n=0.4. FIG. 2(c) is a phase diagram showing nano-phase separated, macro-phase separated, or metastable morphologies as a function of m and n. FIG. 2(d) is a corresponding generalized representation of the phases.

FIGS. 3(a)-3(k) are scanning electron microscopy images of DGEBA-T3000-TETA-D230 with m=0.1 (m=[—NH—]$_{0,T3000}$/[—NH—]$_{0,total}$) and varying n: FIG. 3(a) n=0.0, FIG. 3(b) n=0.1, FIG. 3(c) n=0.2, FIG. (d) n=0.3, FIG. 3(e) n=0.4, FIG. 3(f) n=0.5, FIG. 3(g) n=0.6, FIG. 3(h) n=0.7, FIG. 3(i) n=0.8, FIG. 3(j) n=0.9, FIG. 3(k) n=1.0, where n=[—NH—]$_{0,TETA}$/([—NH—]$_{0,TETA}$+[—NH—]$_{0,D230}$. Scale bar represents 1 μm.

FIG. 5(a) shows the appearance of the thermosets cured at 60° C. and 100° C. FIG. 5(b) is a summary of macroscopic phase behavior. Solid lines connect the composition with the largest wavelength, $d_l=2\pi/q_l$, in each n series. FIG. 5(c) is a graph of x-ray scattering patterns at m=0.3. FIG. 5(d) is a graph of stacked x-ray scattering patterns for the scattering intensity comparison in the $q_m$ domain.

FIGS. 6(a)-6(f) are graphs of the glass transition for DGEBA-T3000-TETA-D230 cured at 100° C. with variable rubber content m and curing agent compositions ranging from n=0 to n=1. FIG. 6(a) m=0.025, FIG. 6(b) m=0.1, FIG. 6(c) m=0.3, FIG. 6(d) m=0.5, FIG. 6(e) m=0.7, FIG. 6(f) m=0.9.

FIGS. 8(a)-8(d) show aspects of tunable PIPS by exploiting reactivity of aliphatic and aromatic amines in a binary curing agent (CA) mixture. FIG. 8(a) shows the chemical structures of DGEBA, T3000, ABA, PDA, and XDA. FIG. 8(b) shows images of plaques. FIG. 8(c) is a graph of loss tangent vs. temperature for DGEBA-T3000-XDA-ABA cured at 100° C. with varying n and constant rubber content m=0.2. FIG. 8(d) is a graph of loss tangent vs. temperature for DGEBA-T3000-XDA-PDA.

FIGS. 11(a)-11(h) show tensile testing of rubber-toughened DGEBA-T3000-TETA-D230 thermosets. FIG. 11(a) through FIG. 11(d) show stress-strain curves for variable rubber content m and constant curing agent composition: FIG. 11(a) n=0.0, FIG. 11(b) n=0.4, FIG. 11(c) n=0.5, and FIG. 11(d) n=1.0. FIG. 11(e) shows stress-strain curves for variable curing agent composition n and constant rubber content m=0.1. FIG. 11(f) shows fracture stress and strain at each binary curing agent composition marked by X's. FIG. 11(g) shows stress-strain curves for variable curing agent composition n and constant rubber content m=0.2. FIG. 11(h) shows fracture stress and strain at each binary curing agent composition marked by X's.

FIGS. 12(a)-12(k) are scanning electron microscopy images of DGEBA-T3000-TETA-D230 with m=0.2 (m=[—NH—]$_{0,T3000}$/[—NH—]$_{0,total}$) with varying n; FIG. 12(a) n=0.0, FIG. 12(b) n=0.1, FIG. 12(c) n=0.2, FIG. 12(d) n=0.3, FIG. 12(e) n=0.4, FIG. 12(f) n=0.5, FIG. 12(g) n=0.6, FIG. 12(h) n=0.7, FIG. 12(i) n=0.8, FIG. 12(j) n=0.9, FIG. 12(k) n=1.0 where n=[—NH—]$_{0,TETA}$/([—NH—]$_{0,TETA}$+[—NH—]$_{0,D230}$. Scale bar represents 1 μm.

FIG. 13(a) illustrates the chemical structures of DGEBA, DER, T3000, and TETA. FIG. 13(b) shows images, FIG. 13(c) shows the glass transition, and FIG. 13(d) shows the x-ray scattering patterns of fully cured DGEBA-DER-T3000-TETA thermosets made by varying e (e=[epoxy]$_{0,DER}$/([epoxy]$_{0,DER}$+[epoxy]$_{0,DGEBA}$) at constant m=0.1 (m=[—NH—]$_{0,T3000}$/[—NH—]$_{0,total}$) cured at 100° C.

FIGS. 14(a)-14(d) show aspects of tunable PIPS in an epoxy thermoset using a binary rubber (R) mixture and TETA. FIG. 14(a) illustrates the chemical structures of DGEBA, PEG, D2000, and TETA. FIG. 14(b) shows images, FIG. 14(c) shows the glass transition, and FIG. 14(d) shows the x-ray scattering patterns of fully cured DGEBA-PEG-D2000-TETA thermosets made by varying r (r=[—NH—]$_{0,D2000}$/([—NH—]$_{0,D2000}$+[—NH—]$_{0,PEG}$) at constant m=0.1 (m=([—NH—]$_{0,PEG}$+[—NH—]$_{0,D2000}$)/[—NH—]$_{0,total}$) cured at 100° C.

DETAILED DESCRIPTION OF THE INVENTION

Figure 4A:
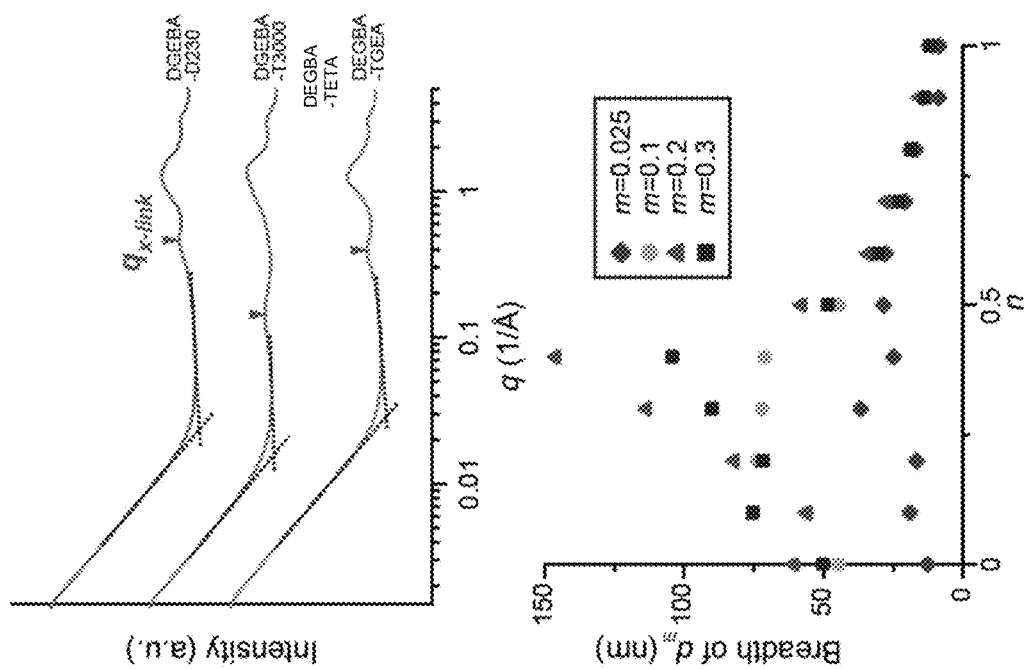
FIG. 4(a) is a graph of X-ray scattering of fully cured DGEBA-T3000-TETA-D230 networks formulated with m=0.3 and variable n.

The present invention is directed to a method for PIPS in step-growth polymerizations, where one component of the polymerization is replaced with a binary mixture, wherein the composition of the binary mixture selected to promote disparate phase separation processes. In this way, facile and broad tunability over morphology can be realized simply through a single compositional parameter (i.e., the composition of the binary mixture), leading to exquisite control over glass transition, physical and mechanical properties.

According to the invention, the method of forming a thermoset comprises mixing a resin, a curing agent, and a secondary polymer reactive with either the resin or the curing agent to provide a liquid mixture, wherein at least one of the resin, curing agent, or secondary polymer comprises at least a binary mixture of resins, curing agents, or secondary polymers; and curing the liquid mixture, whereby the liquid mixture phase separates to form a thermoset with phase separated domains and wherein a composition of the at least binary mixture is selected to tune a size and composition of the phase separated domains. Typically, the composition that is tuned is a binary mixture of resins, curing agents, or secondary polymers, but it can be a ternary or higher order mixture of those constituents as well. Examples are described below of thermosets formed by curing a liquid mixture of an epoxy resin, a rubber, and a curing agent comprising a binary mixture of two curing agents; a liquid mixture of an epoxy resin comprising a binary mixture of two epoxy resins, a rubber, and a curing agent; and a liquid mixture of an epoxy resin, a rubber comprising a binary mixture of two rubbers, and a curing agent. For example, the epoxy resin can comprise a bisphenol A- or bisphenol F-based, aliphatic or cycloaliphatic, or novolac resin. For example, the rubber comprise an amine-functionalized rubber that reacts with the epoxy resin, such as a polyether triamine based on a trifunctional polyoxypropylene backbone, or a butadiene, nitrile, isoprene, chloroprene, styrene-butadiene, silicone, butyl, ethylene-propylene-diene rubber. For example, the curing agent can comprise a binary mixture of a polyether diamine based on a polyoxypropylene backbone and triethylenetetramine, a binary mixture of m-phenylenediamine and m-xylylenediamine, or a binary mixture of 3-aminobenzylamine and m-xylylenediamine. For example, the epoxy resin can comprise a binary mixture of diglycidyl ether of bisphenol A and an epoxide-functionalized poly(propylene oxide). For example, the rubber can comprise a binary mixture of a polyether triamine and poly(ethylene glycol). In addition to epoxy resins, other thermosetting resins can also be used, including polyurethane, polyester, phenolic, vinyl ester, silicone, or polyamide resins. In general, the secondary polymer can be a linear or branched polymer. For example, the physical property that is tuned can be a glass transition temperature, toughness, modulus, strength, fracture strain, impact and/or shock resistance, hardness, permeability, porosity, pore size, transparency, thermal expansion, or conductivity.

Example: Epoxy Resin, Rubber, and Binary Mixture of Curing Agents

To establish a fundamental approach for implementing PIPS in step-growth thermosets by judicious selection of monomer composition and polymerization conditions that regulate dynamic heterogeneity, a conventional, model epoxy system was chosen as an example of the invention, consisting of a diglycidyl ether of bisphenol A (DGEBA) resin, an amine-functionalized rubber (secondary polymer), and a binary mixture of common amine curing agents, as shown in FIG. 1(a). EPON 828, a DGEBA epoxy resin, was obtained from Miller-Stephenson. Jeffamine® D230 is a low-molecular weight polyether diamine based on a polyoxypropylene backbone and Jeffamine® T3000 is high-molecular weight polyether triamine based on a trifunctional polyoxypropylene backbone. Both Jeffamines were obtained from Huntsman Corporation. The rubber content of the system is expressed by the parameter m, while the curing agent composition of the binary mixture is indicated by the compositional parameter n. Inspired by the work of Masser et al., T3000 was employed as a reactive rubber. See K. A. Masser et al., Polymer 58, 96 (2015); and K. A. Masser et al., J. Appl. Polym. Sci. 133(45), 43566 (2016). D230 and triethylenetetramine (TETA) were chosen as exemplary high glass transition temperature ($T_g$) curing agents for the binary mixture as the chemically identical backbones of D230 and T3000 was anticipated to enhance the compatibility of T3000 with the growing epoxy matrix, while the dissimilar TETA backbone would predictably favor phase separation. Indeed, mixtures of DGEBA, TETA, and T3000—initially miscible—quickly phase separated upon curing to form opaque materials indicative of macro-phase separation (i.e., domain size>1 µm), as shown in FIG. 1(b) with n=1.0. In contrast, transparent materials were produced from curing mixtures of DGEBA, D230, and T3000, indicating a homogenous or perhaps nano-phase separated (i.e., domain size<200 nm) morphology, as shown in FIG. 1(b) with n=0.0. Thus, a system in which the overall fraction of rubber (m) is held constant and the curing agent composition (n) of the binary mixture is varied enables tuning of PIPS, based on the distinct apparent morphological response of the two curing agents.

Mixtures of DGEBA and curing agents bearing epoxy or amine functional groups, respectively, were prepared so that epoxies and amine hydrogens were kept at a constant stoichiometric ratio (i.e., $r=[-NH-]_{0,total}/[epoxide]_{0,total}=1$), while the fraction of amine hydrogens from T3000 was varied and defined by the value $m=[-NH-]_{0,T3000}/[-NH-]_{0,total}$, where $[-NH-]_{0,T3000}$ and $[-NH-]_{0,total}$ are the initial molar concentrations of T3000 amine hydrogens and total amine hydrogens in the mixture, respectively. The remaining amine hydrogens were provided by curing agents with concentrations described by $n=[-NH-]_{0,CA2}/([-NH-]_{0,CA1}+[-NH-]_{0,CA2})$, where $[-NH-]_{0,CA1}$ and $[-NH-]_{0,CA2}$ are the initial molar concentrations of amine hydrogens from the binary curing agent mixture. Three binary curing agent mixtures were used; D230/TETA, m-phenylenediamine/m-xylylenediamine (PDA/XDA), and 3-aminobenzylamine/m-xylylenediamine (ABA/XDA) with CA1 representing the former, first curing agent and CA2 representing the latter, second curing agent in each binary pairing. Desired amounts of curing agents defined by n and T3000 defined by m were mixed in a Thinky planetary centrifugal mixer prior to addition of DGEBA and a second round of centrifugal mixing. The homogeneous, uncured liquid mixture was then spread into a silicone mold to obtain the desired shape for mechanical testing (i.e., rectangular plaques or dogbones). The cure temperature was controlled by placing the silicone mold in a temperature-controlled oven, yielding thin, solid, rectangular plaques that were easily demolded from the mold cavity. All samples were isothermally cured. Samples cured with D230/TETA were cured at different temperatures to assess impact on morphology; either 24 h at 140° C., 24 h at 100° C., 72 h at 60° C., or two weeks at room temperature. Polymer samples cured with PDA/XDA or ABA/XDA were cured at 100° C. for 24 h. The formulations of the uncured liquid mixtures are shown in Table 1.

Initially, dynamic mechanical analysis (DMA) was employed to characterize these materials, as the presence of multiple or single local maxima in the mechanical loss tangent (i.e., multiple or single $T_g$) has routinely been associated with macro-phase separation or a lack thereof, respectively. See K. A. Masser et al., Polymer 58, 96 (2015); and K. A. Masser et al., J. Appl. Polym. Sci. 133(45), 43566 (2016). An initial rubber content of m=0.2, approximately 30% by weight T3000, was chosen to ensure the materials comprised a significant fraction of both epoxy matrix and rubber, such that the dynamics of both would be plainly evident in the loss tangent. At intermediate values of n, a transition in appearance between transparent and opaque materials was observed, with the plaque at n=0.4 in FIG. 1(b) exhibiting a bluish tint indicating that the characteristic length scale was approaching the wavelength of visible light. The presence of two distinct loss peaks in FIG. 1(c) confirmed macro-phase separation in the thermoset films at n≥0.5. Interestingly, prior to macro-phase separation (n≤0.4), as the value of n increased, the breadth of the single peak in the mechanical loss tangent broadened, indicative of a larger distribution of polymer segmental relaxations and, thus, an increase in dynamic heterogeneity. This phenomenon is linked to the length scale of chemical composition heterogeneity, as will be described later. Moreover, upon macro-phase separation at n=0.5, the $T_g$s of the macro-phase separated domains continued to separate as the value of n was increased, suggesting a complex hierarchical structure as the composition of the domains evolves, becoming further enriched in either rubber (low $T_g$) or the epoxy matrix (high $T_g$). At a value of n=1, where TETA is exclusively used as curing agent, the loss peaks from the rubber and matrix domains approach those found in homogeneous systems of DGEBA-T3000 or DGEBA-TETA, respectively, implying little incorporation of T3000 into the epoxy matrix or vice versa. Samples formulated with n=0.4 exhibited a cloudy appearance with bluish tints, indicating that the characteristic length scales of compositional fluctuations will diverge toward the macro-phase separated materials. This formulation is likely frozen at a metastable nucleation state prior to entering an unstable, macro-phase separated state at larger values of n. See T. Kyu and J. H. Lee, *Phys. Rev. Lett.* 76(20), 3746 (1996). Indeed, nucleation has been observed in binary polymer mixtures in the metastable window between the spinodal and binodal regions, particularly close to the spinodal region. See T. Kyu and J. H. Lee, *Phys. Rev. Lett.* 76(20), 3746 (1996); and V.-N. Tran Duc and P. K. Chan, *ChemEngineering* 3(3), 75 (2019). Moderate changes to composition can rapidly push the mixture over the spinodal curve into the unstable region, yielding macro-phase separated domains as observed here at high values of n. Interestingly, a thermal quench is typically required to freeze polymer blends in the metastable state, yet kinetic trapping of metastable morphologies has been demonstrated by arresting evolution of the morphology with cross-links formed between domains during polymerization. See V.-N. Tran Duc and P. K. Chan, *ChemEngineering* 3(3), 75 (2019); R. Alert et al., *Nat. Commun.* 7(1), 13067 (2016); K. Kim et al., Science 356(6337), 520 (2017); and M. Seo et al., *Macromolecules* 44(23), 9310 (2011).

To examine the effects of cure temperature on PIPS, and thus the dynamic heterogeneity of these systems, a variety of temperatures were employed to cure formulations with the same variation in composition previously employed. In the transparent regime (i.e., n<0.4), $T_g$s varied with n, yet interestingly, final $T_g$s bore negligible dependence on the temperature at which the samples were cured. Moreover, the breadth of the loss tangents increased with n at each cure temperature, indicating increased dynamic heterogeneity until the point of macro-phase separation was reached. Macro-phase separation was observed at n≥0.5 for materials cured at 100° C., 60° C., or room temperature, while in contrast, macro-phase separation occurred at n≥0.6 for materials cured at 140° C., as shown in FIG. 1(d). The slight shift in the composition boundary is likely attributable to the increased compatibility of the matrix and rubber domains at higher temperatures, requiring a larger quantity of TETA to effect macro-phase separation.

To investigate the effect of rubber content on the morphology of these systems, several series of materials with different m values were prepared over the same range of n and then characterized by DMA. At m=0.1, 0.2 and 0.3 (approximately 20%, 30%, and 40% wt T3000, respectively), the cured samples were opaque at n≥0.5, transparent at n≤0.3, and cloudy at n=0.4. Correspondingly, opaque samples were categorized as macro-phase separated and cloudy samples as metastable morphologies. While the transparency at n≤0.3 indicated miscibility at the length scale smaller than the wavelength of visible light, the loss tangent showed changes in glass transition shape and temperature with m for all such samples, as shown in FIGS. 2(a) and 2(b). Importantly, this observation indicates that the transparent samples were not comprised of a single, homogeneously mixed phase, but rather discrete nano-phase separated domains. Miscible, single-phase systems would exhibit comparatively narrow glass transitions with a predictable relationship between glass transition temperature and composition. Interestingly, the cloudy regime for samples of m=0.025 (approximately 5 wt % T3000), extended from n=0.4 to n=0.6, suggesting a wider metastable window as the rubber content decreased. Here, a parallel can be drawn with the temperature-dependent phase diagram of a two-component polymer blend given by Flory-Huggins solution theory, in which wide metastable windows are observed at compositional extremes. See P. J. Flory, *J. Chem. Phys.* 10(1), 51 (1942); P. J. Flory, *Principles of polymer chemistry* (1953); M. L. Huggins, *J. Am. Chem. Soc.* 64(7), 1712 (1942); and M. L. Huggins, *J. Phys. Chem.* 46(1), 151 (1942). However, rather than exploring phase space utilizing the temperature dependence of the interaction parameter (e.g., X), the interaction parameter was varied based on the composition of the binary curing agent, i.e., chemical compatibility. Morphologies of samples with m=0.025, 0.1, 0.2, and 0.3 were plotted as a function of m and n in FIG. 2(c), such that a phase diagram could be mapped to describe the general effect of composition on morphology, shown in FIG. 2(d).

To visualize the morphology of these thermosets in direct space, the hydrolysable ether bonds of D230 and T3000 were etched with hydroiodic acid (HI) for samples of m=0.1, 0.2, and 0.3 that had been cured at 60° C. As the transport of the HI is relatively slow in highly-crosslinked, glassy domains relative to the rubbery domains, the short etching period was expected to selectively etch the rubbery domains (i.e., T3000) rather than the D230 portion of the epoxy matrix. Here, a parallel can be drawn to oxidation of semi-crystalline polymers, where strong oxidants are used to selectively stain amorphous domains for electron microscopy by enhanced diffusion. See Contrast Enhancement, In *Electron Microscopy of Polymers*, Michler, G. H., Ed. Springer Berlin Heidelberg: Berlin, Heidelberg, pp 241-260 (2008). Indeed, extended etching periods of three days were found to yield complete disintegration of the polymer samples as both rubber and matrix were fragmented.

The scanning electron microscopy (SEM) analysis of etched fracture surfaces for the DGEBA-T3000-TETA-D230 sample with m=0.1 and varying n, shown in FIGS. 3(a)-(k), clearly illustrate the broad range of PIPS length scales accessible via this approach, and provides further insight into the visual appearance and glass transition of these materials. Well-dispersed spherical domains were generated at n=0.4 (FIG. 3(e)), albeit on the order of a few hundred nm or less, yet, were prominent features at n≥0.5 ranging from several hundred nm to several μm, supporting the previously suggested notion of a metastable nucleation regime followed by the generation of macro-phase separated domains as the mixture enters the unstable region. Larger domains were formed at increasing values of n (FIGS. 3(f)-(k)), consistent with increasing expulsion of T3000 and $T_g$s approaching the 'pure' rubbery or matrix limits seen in the corresponding DMA. Moreover, samples of n≤0.4 (FIGS. 3(a)-(d)) exhibited clear evidence of organized structure at sub-100 nm length scales, supporting the notion that these particular materials were, in fact, nano-phase separated, likely in a bicontinuous arrangement. The lack of well-defined pores or nano-phase separated domains observed at n≤0.4 can be rationalized by recognizing that the individual domains are not compositionally pure, as contrasted with, for example, a micro-phase separated block polymer. The broad $T_g$s seen by DMA imply that the rubber domains contain a significant distribution of matrix components and vice versa, such that the selectivity of etching by HI will be reduced as n decreases. Nevertheless, the SEM analysis illustrates how these systems transition from block polymer-like nano-phase separation to homopolymer-like macro-phase separation as the curing agent composition is varied.

To further elicit the microstructure of these polymeric materials, x-ray scattering characterizations were employed to probe the heterogenous spatial distributions. FIG. 4(a) is a graph of X-ray scattering of fully cured DGEBA-T3000-TETA-D230 networks formulated with m=0.3 and variable n. A few general scattering characteristics were identified.

Figure 4B:
FIG. 4(b) is a graph of X-ray scattering of homogeneous DGEBA-D230, DGEBA-T3000, and DGEBA-TETA networks.
Figure 4C:
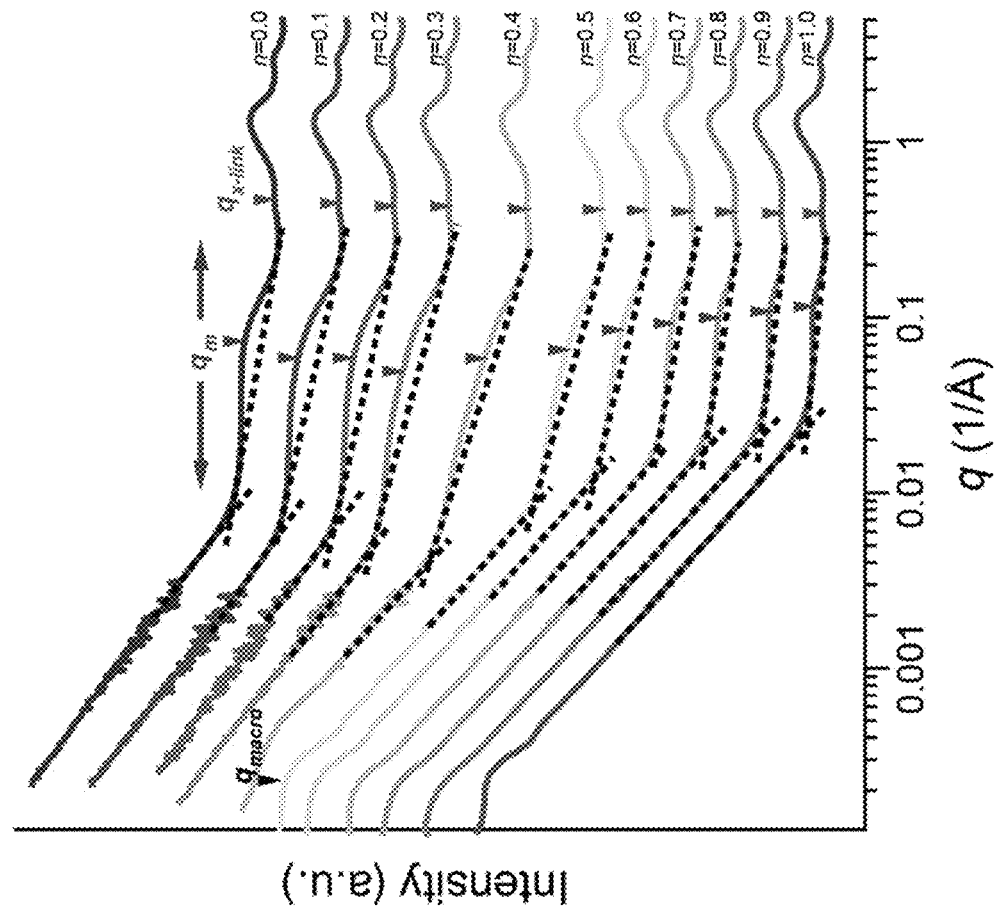
FIG. 4(c) is a graph showing the breadth of $d_m$ as a function of n for m=0.025, 0.1, 0.2, and 0.3.

Firstly, strong upturns were observed at q<0.02 Å$^{-1}$ which have been observed from nearly all polymeric materials though the origin of these upturn features are still not clearly identified. See J. H. Wendorff and E. W. Fischer, *Kolloid-Zeitschrift und Zeitschrift fir Polymere* 251(11), 884 (1973); S. Xie et al., *Macromolecules* 53(16), 7141 (2020); and B. H. Jones et al., *Polymer* 205, 122783 (2020). The macro-phase separations of n≥0.4 thermosets were indicated by the scattering features marked with $q_{macro}$. Further analysis of these features was not conducted due to the poor mechanical properties of such thermosets (as described more fully below), despite their structural complexity arising from size and shape dispersity of macro-phase separated domains and spatial correlations. In addition, the structural features of the macro-phase separated domains were plainly evident from SEM, shown in FIGS. 3(f)-(k). In the larger q domain (>0.02 Å$^{-1}$), two characteristic correlation peaks are observed at q≈0.08 Å$^{-1}$ and q≈0.4 Å$^{-1}$ marked with $q_m$ and $q_{x-link}$, respectively, related to the key mesoscale structures of the thermosets. For comparison, the reciprocal correlation lengths, $d_{x-link}=2\pi/q_{x-link}$, between crosslinks for thermosets formed from single-phase combinations of DGEBA with the individual amine-functionalized components were characterized and found to depend on the molecular weight of the amine components, as shown in FIG. 4(b) and Table 2. The DGEBA-T3000 thermoset resulted in the relatively large spatial correlation $d_{x-link,T3000}$=4.4 nm. In contrast, the characteristic crosslink distances of the DGEBA-D230 and DGEBA-TETA thermosets were less than 1.6 nm due to their relatively small sizes. These $d_{x-link}$'s of the single-phase thermosets indicated that the $q_{x-link}$ peaks ($d_{x-link}$=1.38-1.57 nm) of the m=0.3 phase-separated thermosets, shown in FIG. 4(a) and Table 4, were associated with the crosslink lengths between DGEBA-TETA and DGEBA-D230 chains. In contrast, the $q_m$ features in FIG. 4(a) and Table 3 are not believed to solely represent the crosslink correlations between DGEBA and T3000, but rather show strong nanoscale compositional fluctuations between rubber- (DGEBA-T3000) and matrix-rich domains. The corresponding length of the $q_m$ peak increases from $d_m=2\pi/q_m$=8.55 nm at n=0 to a maximum of 12.69 nm at n=0.3, and then gradually decreases to 5.43 nm at n=1, all larger than $d_{x-link,T3000}$=4.4 nm. Moreover, the characteristic breadths of the $q_m$ peaks widen as n increases up to $d_{m,max}$≈110 nm at m=0.3 and n=0.3, followed by macro-phase separations, as shown in FIG. 4(c). In addition, overlaying the scattering patterns based on the peak intensity at q>1.3 Å$^{-1}$ (associated with molecular motifs) revealed amplified scattering intensity of the $d_m$ feature until the macro-phase separation point, after which the intensity decreases. The increase of the scattering intensity also scales with the breadth of $d_m$ shown in FIGS. 4(a) and 4(c). See Ryong-Joon Roe, *Methods of X-Ray and Neutron Scattering in Polymer Science*, Oxford U. Press, New York (2000). These pronounced compositional fluctuations and length scales indicate that the thermoset at m=0.3 and n=0.3, including the thermosets at m=0.1 and 0.2 at the same n=0.3, are close to a critical point shown in FIG. 2(c). See V.-N. Tran Duc and P. K. Chan, *ChemEngineering* 3(3), 75 (2019); and K. Binder, *Rep. Prog. Phys.* 50(7), 783 (1987). Beyond the macro-phase separation points, the composition of phase-separated domains approach those of the binary thermosets, and the $d_m$ approaches 5.43 nm at n=1, close to the $d_{x-link}$=4.4 nm of the DGEBA-T3000 thermoset, i.e., the thermoset phase-separates into nearly pure rubber (DGEBA-T3000) and matrix domains (Tables 2 and 3).

Figures 5A, 5B:
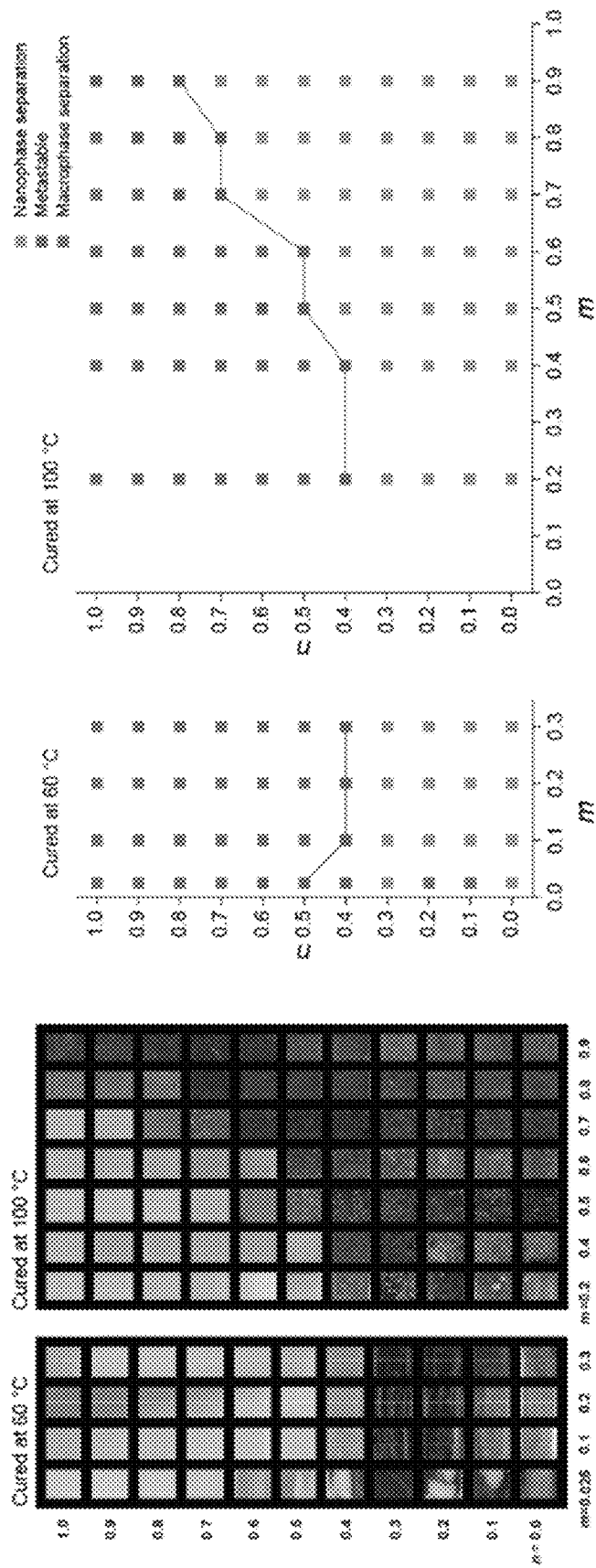
FIGS. 5(a)-5(d) show the phase behavior of DGEBA-T3000-TETA-D230 thermosets over a larger range of m and n.
Figure 5D:
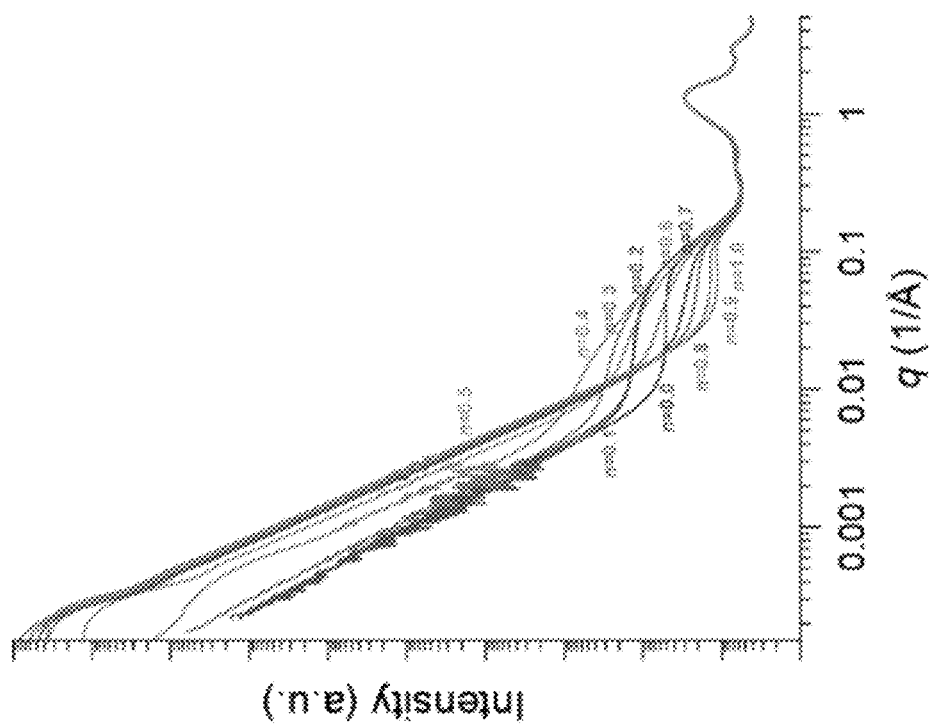
Figure 5C:
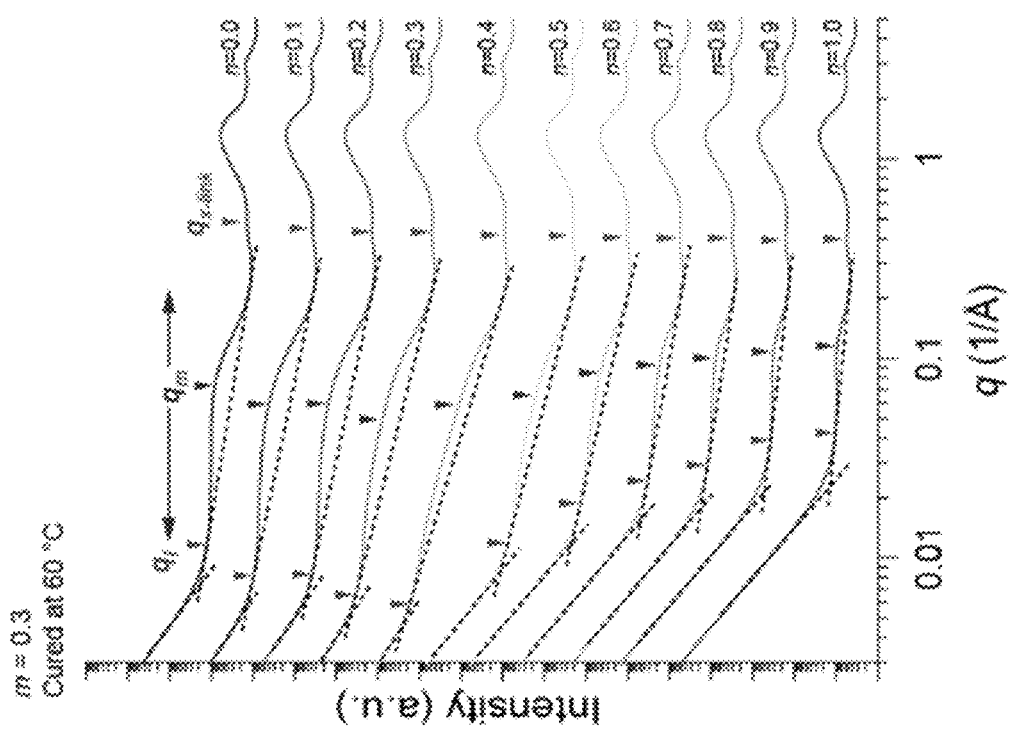
Figure 5F:
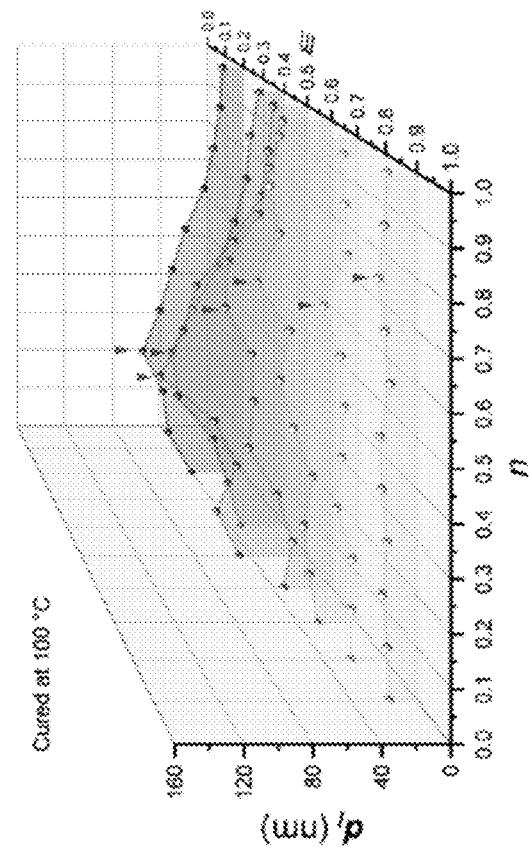
FIG. 5(f) is a summary graph of $d_l$ of the thermosets cured at 100° C.
Figure 5E:
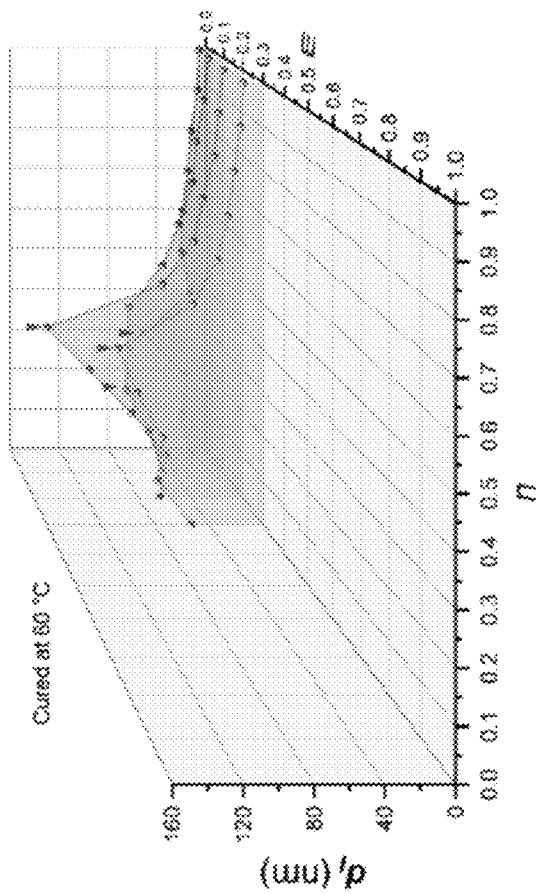
FIG. 5(e) is a summary graph of the longest wavelengths of the $q_m$ domain, $d_l$, of the thermosets cured at 60° C.

The composition of the DGEBA-T3000-TETA-D230 system was then expanded to include essentially the entire phase space accessible through variation of rubber content (m) and curing agent ratio (n). FIG. 5(a) shows the appearance of these materials, cured at either 60° C. or 100° C., from m=0.025 (mostly epoxy) up to m=0.9 (mostly rubber) and from n=0 (curing agent is pure D230) to n=1 (curing agent is pure TETA). It can be seen that the boundary between transparent and opaque materials shifts to higher n as m increases. That is, with increasing rubber content, the curing agent must be biased increasingly towards TETA in order to observe macro-phase separation. FIG. 5(b) captures these boundaries in the form of a phase diagram, where transparent, hazy, and opaque materials are categorized as nano-phase separated, metastable, and macro-phase separated, respectively. FIG. 5(c) shows representative x-ray scattering patterns for a series of materials with the curing agent varied from n=0 to n=1 at a fixed rubber content m=0.3. It can be seen that the peak corresponding to nano-phase separation, marked by $q_m$, broadens from n=0 to n=0.4, then narrows and diminishes in intensity from n=0.4 to n=1. Thus, the distribution of nano-phase separated domain sizes broadens from n=0 to n=0.4, then the extent to which the material is nano-phase separated diminishes as the system enters and progresses into the macro-phase separated regime from n=0.4 to n=1. The value of n at which the boundary between nano-phase separation and macro-phase separation—i.e., the metastable regime—occurs consistently exhibits the broadest distribution in $q_m$. This fact is illustrated in FIG. 5(d), which shows the largest nano-phase separated length scale, $d_l$, in the material over the entire range of phase space investigated.

FIGS. 6(a)-(f) show the glass transition of the thermosets over the majority of phase space. At low rubber content (m=0.025 and m=0.1), the dominant feature is the glass transition of the epoxy domains at high temperature. In the macro-phase separated regime, a weak signature is evident at low temperature corresponding to the glass transition of the rubber domains. These features merge in the nano-phase separated regime, with the overall effect being a reduction in glass transition temperature. At high rubber content (m=0.5, m=0.7, m=0.9), the trends are effectively reversed. The dominant feature is the glass transition of the rubber domains at low temperature. In the macro-phase separated regime, a weak signature is evident at high temperature corresponding to the glass transition of the epoxy domains. These features again merge in the nano-phase separated regime, with the overall effect now being an increase in glass transition temperature. The glass transition behavior at intermediate rubber content (m=0.3) has already been discussed, and shows the most complexity in terms of glass transition breadth and position, due to the comparable contributions of both the epoxy and rubber domains and their associated, individual glass transitions.

Figure 7:
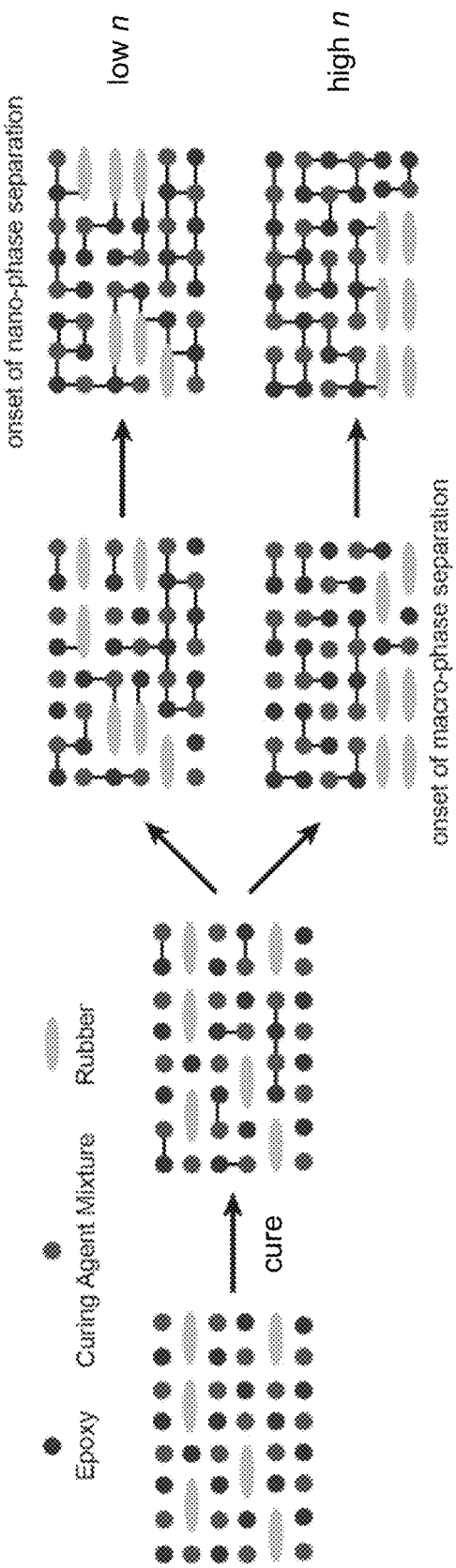
FIG. 7 is a schematic description of a proposed PIPS mechanism in epoxy-rubber-binary curing agent mixtures with nano- or macro-phase separation controlled by chemical compatibility or reactivity. The upper and lower paths represent scenarios where the onset of phase separation is comparatively late or early in the curing process, respectively, critically controlled by the curing agent composition. Note the number of bonds between rubber and epoxy at the onset of phase separation.

From the collective characterization of the DGEBA-T3000-TETA-D230 system, a mechanism shown in FIG. 7 is proposed by which facile control over PIPS is obtained, wherein nano- or macro-phase separation is controlled by chemical compatibility. At low values of n (upper path), where D230 dominates the binary curing agent, the chemical similarity of D230 and T3000 enhances the compatibility of the rubber with the polymerizing matrix; thus, the onset of phase separation requires a greater extent of cure (i.e., molecular weight) to be reached. Conversely, at higher values of n (lower path), the incorporation of the comparatively incompatible TETA in the polymerizing matrix promotes phase separation earlier in the cure profile. The morphology is believed to be defined by the extent to which the reactive T3000 rubber is covalently linked to the polymerizing matrix. When the onset of phase separation is delayed (upper path), the rubber and matrix are covalently bound, thus the system behaves akin to a block polymer. When the onset of phase separation is earlier (lower path), the rubber and matrix are not linked, thus the system behaves similarly to a mixture of incompatible homopolymers.

This proposed mechanism suggests the absence of covalent attachments between rubber and matrix would yield macro-phase separated systems at all values of n. Moreover, it prompts an inquiry into whether similar tunability can be achieved by a kinetically driven system in which a curing agent with a rate constant much greater than the rubber (i.e., $k_{CA} \gg k_{rubber}$) would favor macro-phase separation, while a curing agent with a similar rate constant (i.e., $k_{CA} \approx k_{rubber}$) would favor nano-phase separation. In this context, it is important to note that the aliphatic amines of TETA are highly reactive, leading to rapid cure kinetics, which likely implies an even lower number of matrix-rubber bonds at the onset of phase separation in TETA-rich systems. Indeed, this notion recalls the work by Grubbs et al., on epoxy/block copolymer blends. See R. B. Grubbs et al., *Macromolecules* 33(26), 9522 (2000). In their work, three possibilities were proposed based on the reactivity of the block copolymer used in tandem with an epoxy system cured with 4,4'-methylenedianiline (MDA); non-reactive, reactive and kinetically equivalent, and reactive yet with a kinetically reduced curing rate. Non-reactive block copolymers experienced localized expulsion from the epoxy-network during curing to form phase-separated domains. Block copolymers with curing rates comparable to MDA avoided local expulsion when the epoxy-miscible blocks were large; however, with shorter epoxy-miscible blocks, the blends began to macro-phase separate due to the decrease in miscibility. Finally, reactive block copolymers with curing rates asymmetric to that of the epoxy/hardener were displaced and formed macro-phase separated morphologies.

Figure 9:
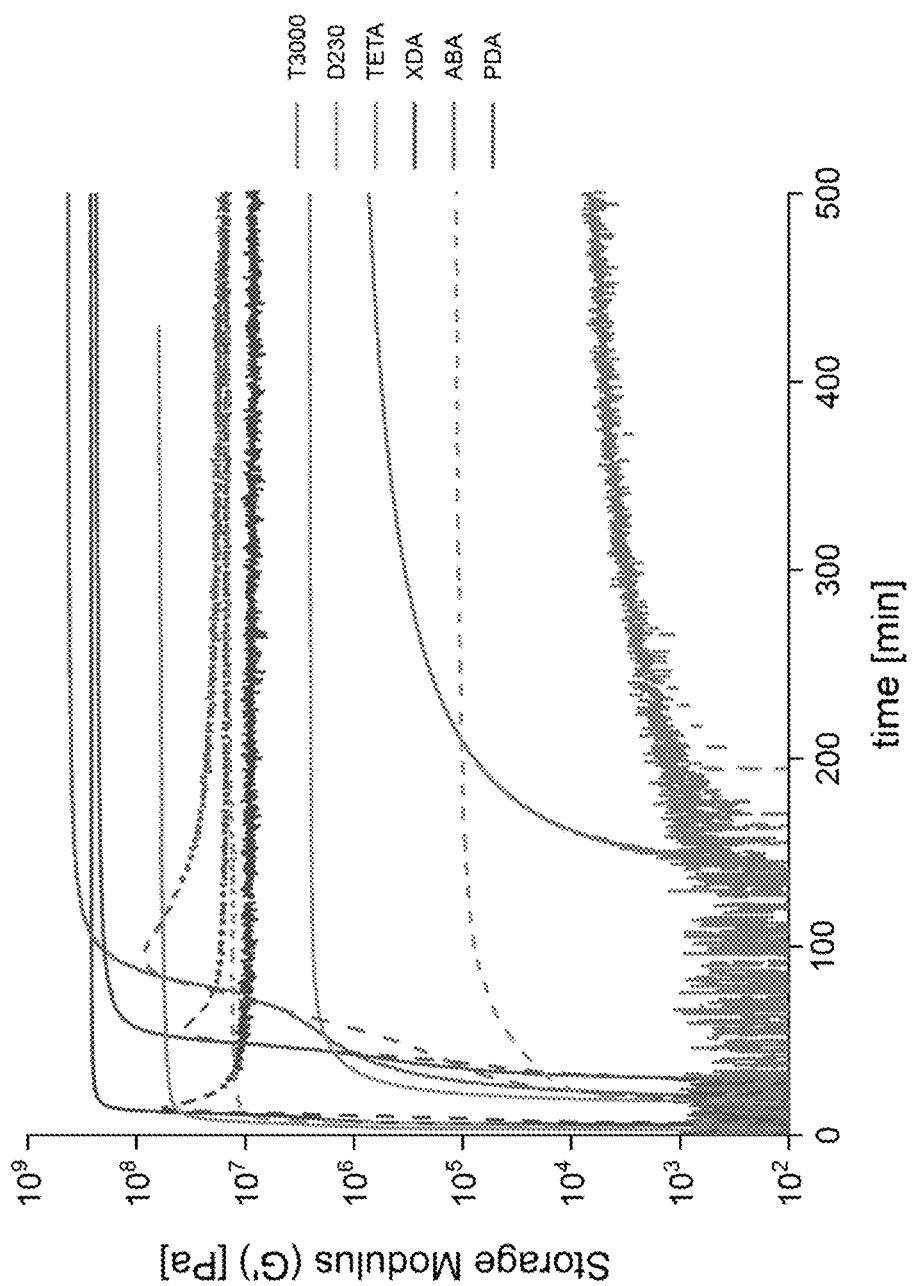
FIG. 9 is a graph of cure profiles of each amine-bearing reagent used in this study cured exclusively in stoichiometric ratios with DGEBA isothermally at 100° C. Storage moduli (G') are shown as solid lines and loss moduli (G") are shown as dashed lines.

To test these hypotheses, equivalent thermosets were prepared in which T3000 was substituted with a comparatively unreactive poly(propylene glycol) triol of similar molecular weight. See L. Shechter et al., *Ind. Eng. Chemistry* 48(1), 94 (1956). As anticipated, macro-phase separation was evident by opacity in all formulations of m=0.2, regardless of curing agent composition (n), confirmed by the presence of multiple local maxima in DMA. Subsequently, to investigate the impact of amine reactivity on PIPS, alternative amine curing agents were explored. To mitigate differences in thermodynamic compatibility of the network components, several diamine derivatives of meta-phenylene were chosen. As aliphatic and aromatic amines of otherwise similar structure have been shown to exhibit disparate reactivities to epoxies—aliphatic amines are significantly more reactive—systems comprised of m-xylylenediamine (XDA) bearing two aliphatic amines, m-phenylenediamine (PDA) bearing two aromatic amines, and 3-aminobenzylamine (ABA) bearing an aliphatic and aromatic amine were investigated, as shown in FIG. 8(a). See M. Pramanik et al., *J. Coat. Technol. Res.* 11(2), 143 (2014). In curing profiles of stoichiometric mixtures of DGEBA with each individual curing agent, shown in FIG. 9, the di-aliphatic amine XDA and the di-aromatic amine PDA showed the fastest and slowest build-up in modulus, respectively. Interestingly, the modulus build-up for DGEBA-XDA was comparable to DGEBA-TETA, while DGEBA-ABA and DGEBA-PDA approached that of DGEBA-D230. Thermoset samples with a rubber content m=0.2 were prepared with a single curing agent—XDA, PDA, or ABA—to ascertain the nature of PIPS. XDA produced opaque, macro-phase separated samples, as shown in FIG. 8(b) (n=1.0) while relatively sluggish PDA or ABA each yielded transparent samples, as shown in FIG. 8(b) (n=0.0), confirming the critical impact of kinetics on the balance of covalently-bound species in the network and, thus, the outcome of PIPS.

Figure 10A:
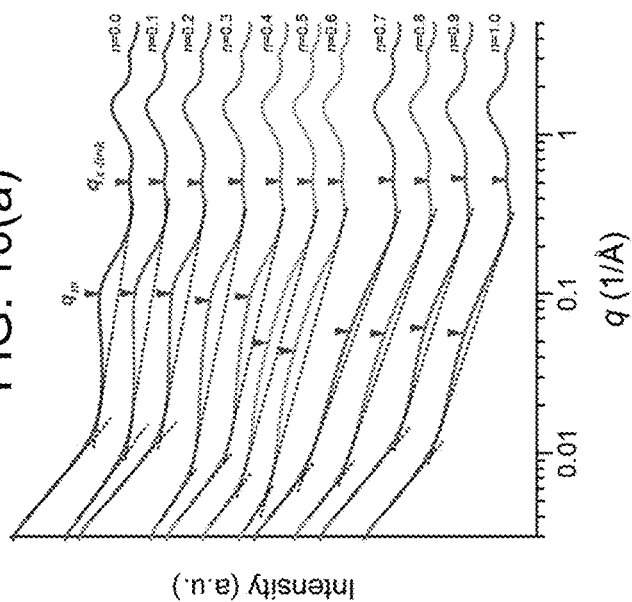
FIG. 10(a) is a graph of X-ray scattering of samples formulated with DGEBA-T3000-XDA-ABA networks cured at 100° C. for formulations of m=0.2 and n=0.0-1.
Figure 10B:
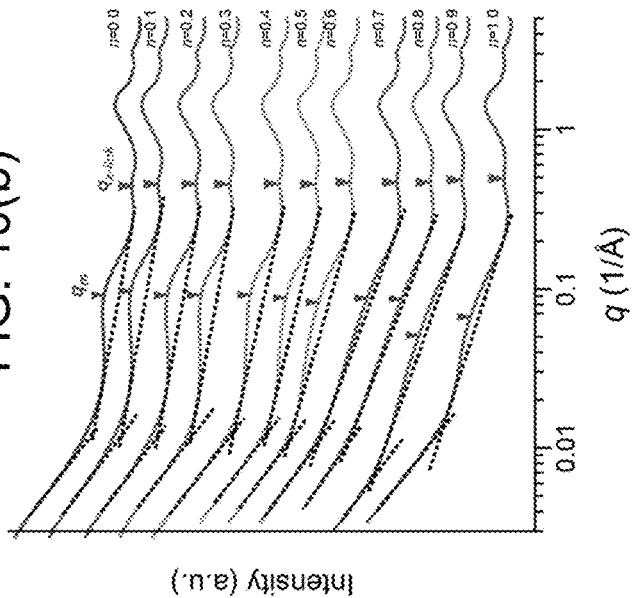
FIG. 10(b) is a graph of X-ray scattering of samples formulated with DGEBA-T3000-XDA-PDA networks cured at 100° C. for formulations of m=0.2 and n=0.0-1.
Figure 10C:
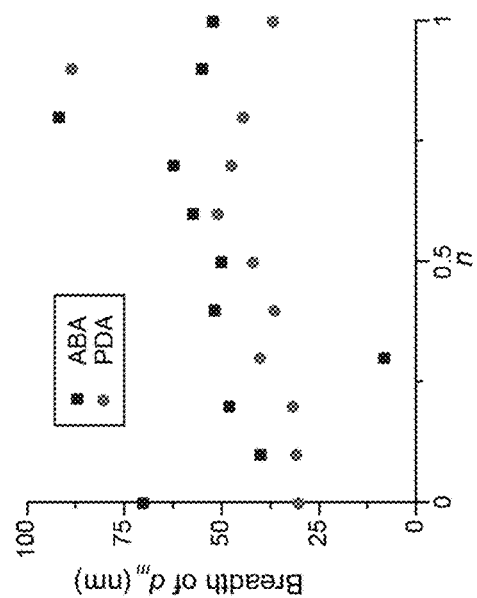
FIG. 10(c) is a graph of breadth of $d_m$ as a function of n for both formulations. For this system, (a) n=[—NH—]$_{0,XDA}$/([—NH—]$_{0,XDA}$+[—NH—]$_{0,ABA}$) or (b) n=[—NH—]$_{0,XDA}$/([—NH—]$_{0,XDA}$+[—NH—]$_{0,PDA}$).

With the significance of curing agent reactivity established, two new binary curing agent systems were envisioned where the first curing agent is either PDA or ABA and the second curing agent is XDA, to similarly enable tuning between nano-phase or macro-phase separated networks by variation of n. Samples of m=0.2 were prepared with n varied from 0 to 1 and characterized by DMA, as shown in FIGS. 8(c) and 8(d). The onsets of macro-phase separation for the series containing ABA and PDA occurred at n≥0.9 for both samples. Interestingly, in the X-ray scattering data shown in FIGS. 10(a)-(c), the breadth of $d_m$ reached a maximum at n=0.8 and n=0.9 for the ABA and PDA systems, respectively, with the macro-phase separated samples occurring at a lower value of n for ABA as the greater rate of bond formation is able to exclude the sluggish T3000 at a lower concentration of XDA. Unlike the previous systems cured with D230 and TETA, the breadth in $d_m$ was relatively independent of n in the nano-phase separated regime, suggesting the variation in (nano)domain size and distribution may have arose from localized miscibility differences between the T3000 and D230 or TETA components of the network, as opposed to the high reactivity of TETA relative to D230. The profound connection between glass transition and microstructure is even further apparent when observing that the $T_g$ in the nano-phase separated regime also shows little change in breadth, and thus dynamic heterogeneity, for the systems using XDA, ABA, and PDA. Conversely, a strong dependence on n was seen in both the breadth of $T_g$ and $d_m$ for systems using D230 and TETA. These results confirm that PIPS can be controlled coarsely between nano- and macro-phase separated regimes by balance of cure kinetics, but finer control over morphology and the resultant glass transition requires balance of the chemical compatibility of network components.

As this approach to PIPS offers an unprecedented degree of control over morphology in step-growth thermosets, the relationship between morphology and physical properties can be uniquely assessed, such as the degree to which rubber domain size controls rubber toughening. To this end, tensile testing was employed to provide insight into the mechanical properties of the DGEBA-T3000-TETA-D230 thermosets. Previously published characterization has shown that homogeneous DGEBA-D230 (i.e., m=0 and n=0.0) or DGEBA-TETA (i.e., m=0 and n=1.0) networks exhibit ductile and brittle failure, respectively. See L. Shan et al., *J. Polym. Sci., Part B: Polym. Phys.* 37(19), 2815 (1999); and F. G. Garcia et al., *J. Appl. Polym. Sci.* 106(3), 2047 (2007). In the tensile measurements shown in FIGS. 11(a) and 11(d), respectively, it was found that both homogeneous networks exhibited brittle fracture, as evidenced by low fracture strain and the absence of a yield point. When rubber was introduced (m increases), and the curing agent was either exclusively D230 or TETA (n=0.0 and n=1.0, respectively), the epoxy systems exhibited ductile or brittle failure, respectively, regardless of rubber content, but their ultimate strengths decreased with increasing m, as shown in FIGS. 11(b) and 11(c). Interestingly, while the D230-based formulation (n=0.0) generally demonstrated larger fracture strain with increasing rubber content, both ultimate strength and fracture strain were reduced for the TETA-based formulation (n=1.0) up to m=0.2, likely connected with the inability of the macro-phase separated morphology to plastically deform. The rubber domains in extremely macro-phase separated morphologies may act as large flaws that, in fact, drive brittle fracture. See O. A. Serenko et al., *Polym. Sci. Ser. A* 48(3), 302 (2006); and S. Wu, *Polymer* 26(12), 1855 (1985). Indeed, even modest additions of D230 relative to the D230-free extreme (n=1.0) increased the fracture strain, as evident from FIG. 11(e), with a transition from brittle to ductile fracture (yield point) evident at all n<0.8 for a rubber content of m=0.1. More importantly, FIG. 11(e) shows that the fracture strain monotonically increased as the D230 content of the binary curing agent increases, without any significant impact on modulus or tensile strength. This remarkable result cannot be dismissed as simply a consequence of the proximity of the test temperature to $T_g$, as epoxy thermosets tested near $T_g$ will exhibit high elongation, but also low modulus. Rather, the data show that the tensile properties are dominated by microstructure, with nano-phase separated structures (and smaller domain sizes) enhancing toughness without sacrificing other key characteristics. Although fracture toughness measurements have not been performed, the tensile behavior suggests that nano-phase separated rubber domains would also favor best performance in these thermosets, in contrast with previous work that established an ideal rubber domain size on the order of hundreds of nm. See Q.-H. Le et al., *Polym.* 51(21), 4867 (2010); L.-C. Tang et al., *Mater. Chem. Phys.* 141(1), 333 (2013); and C. B. Bucknall and D. R. Paul, *Polymer* 54(1), 320 (2013). The latter results were obtained using spherical, pre-formed rubber particles, hence rubber toughening may be a function of rubber domain size and shape.

Along these lines, SEM imaging of macro-phase separated formulations with m=0.1 revealed the etched, spherical rubbery domains were surrounded by a sea of highly cross-linked matrix, as shown in FIGS. 3(e)-(k). Interestingly, this organizational arrangement inverted at m≥0.2, shown in FIGS. 12(a)-(k), where the unetched, filled spheres of epoxy agglomerated in voids resulting from etching of the rubbery, T3000 domains; in other words, the continuous matrix and dispersed domains were rubber-rich and curing agent-rich, respectively. This morphology resulted in unstable architectures, as was readily apparent in imaging of such samples at m=0.3. Moreover, the transition from rubber-in-epoxy to epoxy-in-rubber macro-phase separated morphology was plainly evident from tensile testing. At high rubber loading (m=0.2), there was a stark difference in the stress-strain curves from nano- and macro-phase separated materials, with the former exhibiting comparatively low modulus and fracture strain and the latter exhibiting high (and composition-independent) modulus, high fracture strain, and distinct yield points, as shown in FIGS. 12(g) and 12(h). In light of the SEM images, the poor mechanical properties of the macro-phase separated materials are unsurprising, as their behavior is likely dominated by the weak rubber matrix. The distinct transition in tensile performance at the boundary between nano- and macro-phase separation further suggests that the nano-phase separated materials may be defined by a bicontinuous arrangement of matrix and rubber domains. Ultimately, these results demonstrate the ability to optimize mechanical properties by controlling morphology in PIPS through careful and systematic selection of network composition. Indeed, a single compositional parameter enables the fine-tuning of epoxy-based thermoset resins to achieve a range of mechanical properties without the conventional sacrifice of strength or modulus.

Example: Binary Mixture of Epoxy Resins, Rubber, and Curing Agent

Figure 13A:
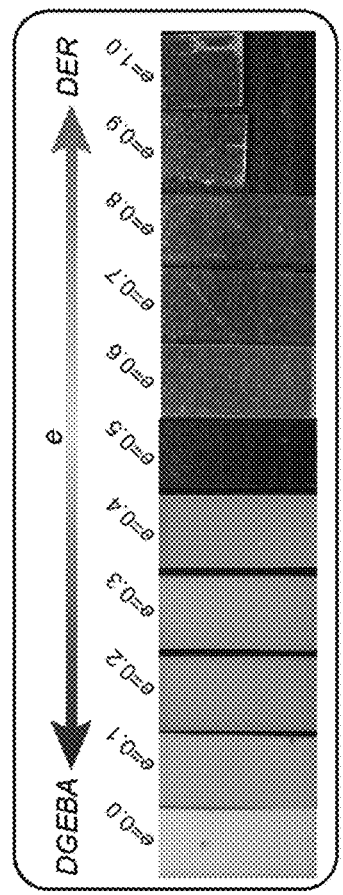
FIGS. 13(a)-13(d) show aspects of tunable PIPS in an epoxy thermoset using a binary epoxy (E) mixture and a rubbery polymer.
Figure 13B:
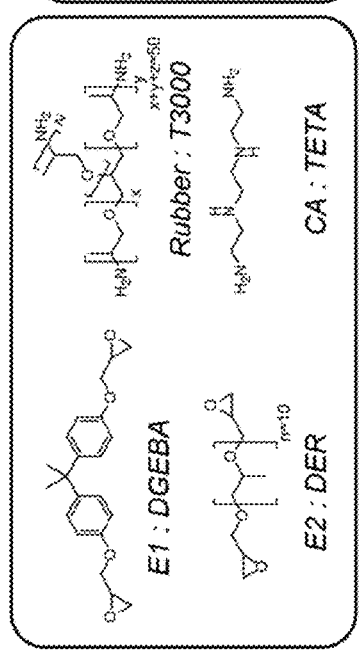
Figure 13C:
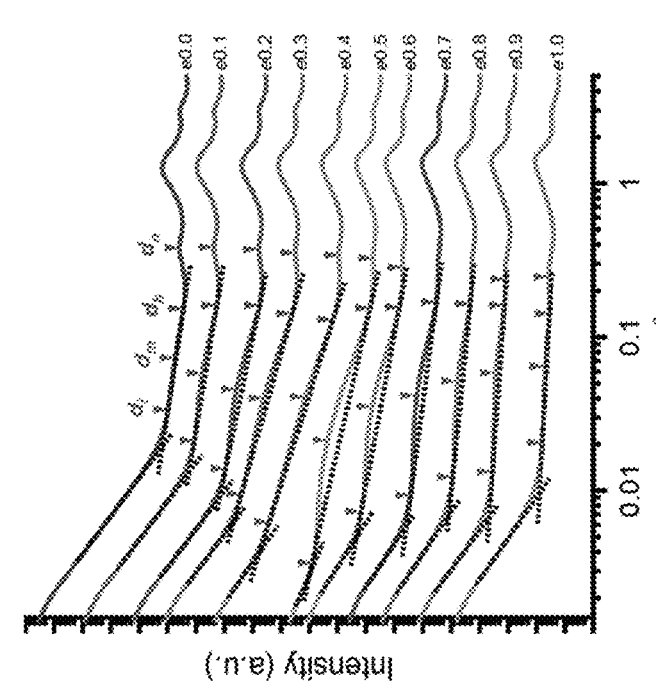
Figure 13D:
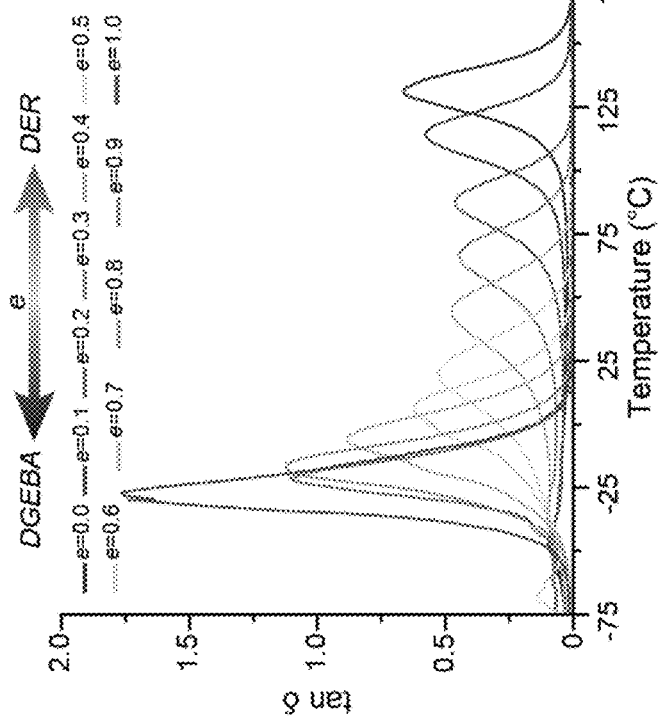

The previous examples use a binary curing agent to tune phase separation and properties, but it is also possible to use either judiciously selected binary epoxy resins or binary rubbers (i.e., secondary polymers) to achieve a similar effect. FIG. 13 shows a system in which the rubber and curing agent are Jeffamine T3000 and TETA, respectively, and where tuning is achieved using a binary epoxy resin comprised of DGEBA and an epoxide-functionalized poly(propylene oxide) (DER). The compositional parameter e describes the binary resin composition, with e=0 corresponding to pure DGEBA and e=1 corresponding to pure DER. It can be appreciated that lower e favors phase separation of the epoxy and rubber, whereas higher e opposes phase separation, based on the identical chemical repeat units of DER and T3000, as shown in FIG. 13(a). Indeed, FIG. 13(b) shows that the thermosets are opaque from e=0 to e=0.4 and transparent from e=0.5 to e=1. The x-ray scattering patterns in FIG. 13(d) show peaks indicating nano-phase separated domains with characteristic length scale $d_m$ and breadth $d_l$ to $d_n$. The breadth increases in the nano-phase separated regime from e=1 to a maximum at e=0.5, then decreasing and weakening in the macro-phase separated regime from e=0.4 to e=0. The signature of nano-phase separation, $d_m$, is so weak when the resin is pure DER (e=1) as to be nearly imperceptible. This particular material may be considered as a single homogeneous phase consisting of a random network of the various constituents. FIG. 13(c) shows the glass transition of the corresponding thermosets. In contrast to the examples which employed a binary curing agent, where both curing agents give an epoxy phase with high $T_g$, the DGEBA resin gives a high $T_g$ epoxy, whereas the DER resin gives a low $T_g$ epoxy. Therefore, there is a monotonic decrease in overall $T_{g\ from\ e=}0$ to e=1. This example uses a low rubber content (m=0.1) so the relative contribution of the rubber to the glass transition is weak. However, it can be seen that the glass transition is broadest around e=0.4 and e=0.5, where the boundary between macro-phase separation and nano-phase separation is crossed, but where there is still significant separation between the individual glass transitions of the epoxy and rubber domains.

Example: Epoxy Resin, Binary Mixture of Rubbers, and Curing Agent

FIG. 14 shows a system in which the resin and curing agent are DGEBA and TETA, respectively, and where tuning is achieved using a binary rubber mixture comprised of Jeffamine D2000 and poly(ethylene glycol) (PEG). The compositional parameter R describes the binary rubber composition, with R=0 corresponding to pure PEG and R=1 corresponding to pure D2000. PEG is more compatible and D2000 is less compatible with the TETA-cured DGEBA epoxy. Consequently, as shown in FIG. 14(b), the thermoset with R=0 is transparent, whereas the thermoset with R=1 is opaque. In fact, the thermoset at R=0.1 is hazy and all thermosets with R>0.2 are opaque, indicating a large window over which macro-phase separation is dominant in this system. Again, this example uses a low rubber content (m=0.1) so the relative contribution of the rubber to the glass transition is weak. As shown in FIG. 14(c), the dominant feature is the glass transition of the epoxy domains at high temperature. In the macro-phase separated regime, a weak signature is evident at low temperature corresponding to the glass transition of the rubber domains. These features merge in the nano-phase separated regime, with the overall effect being a reduction in glass transition temperature. The sample with R=1 shows a unique glass transition profile with multiple peaks, but this can be ascribed to gross separation at very large length scales (>10 μm) and consequent incomplete reaction of functional groups.

The present invention has been described as a method of tuning physical properties of thermosets. It will be understood that the above description is merely illustrative of the applications of the principles of the present invention, the scope of which is to be determined by the claims viewed in light of the specification. Other variants and modifications of the invention will be apparent to those of skill in the art.

TABLE 1

Formulations defined by n and m, with wt % of each reagent shown

| m | n | DGEBA wt % | T3000 wt % | TETA wt % | D230 wt % |
|---|---|---|---|---|---|
| 0.025 | 0 | 73.3 | 4.9 | 0.0 | 21.8 |
| 0.025 | 0.1 | 74.3 | 4.9 | 0.9 | 19.9 |
| 0.025 | 0.2 | 75.2 | 5.0 | 1.9 | 17.9 |
| 0.025 | 0.3 | 76.2 | 5.1 | 2.9 | 15.9 |
| 0.025 | 0.4 | 77.2 | 5.1 | 3.9 | 13.8 |
| 0.025 | 0.5 | 78.2 | 5.2 | 4.9 | 11.6 |
| 0.025 | 0.6 | 79.3 | 5.3 | 6.0 | 9.4 |
| 0.025 | 0.7 | 80.4 | 5.3 | 7.1 | 7.2 |
| 0.025 | 0.8 | 81.5 | 5.4 | 8.2 | 4.8 |
| 0.025 | 0.9 | 82.7 | 5.5 | 9.4 | 2.5 |
| 0.025 | 1 | 83.9 | 5.6 | 10.6 | 0.0 |
| 0.1 | 0 | 64.9 | 17.2 | 0.0 | 17.8 |
| 0.1 | 0.1 | 65.6 | 17.4 | 0.8 | 16.2 |
| 0.1 | 0.2 | 66.3 | 17.6 | 1.5 | 14.6 |
| 0.1 | 0.3 | 67.0 | 17.8 | 2.3 | 12.9 |
| 0.1 | 0.4 | 67.7 | 18.0 | 3.2 | 11.2 |
| 0.1 | 0.5 | 68.5 | 18.2 | 4.0 | 9.4 |
| 0.1 | 0.6 | 69.2 | 18.4 | 4.8 | 7.6 |
| 0.1 | 0.7 | 70.0 | 18.6 | 5.7 | 5.8 |
| 0.1 | 0.8 | 70.8 | 18.8 | 6.6 | 3.9 |
| 0.1 | 0.9 | 71.6 | 19.0 | 7.5 | 2.0 |
| 0.1 | 1 | 72.4 | 19.2 | 8.4 | 0.0 |
| 0.2 | 0 | 56.4 | 29.9 | 0.0 | 13.8 |
| 0.2 | 0.1 | 56.8 | 30.1 | 0.6 | 12.5 |
| 0.2 | 0.2 | 57.3 | 30.4 | 1.2 | 11.2 |
| 0.2 | 0.3 | 57.7 | 30.6 | 1.8 | 9.9 |
| 0.2 | 0.4 | 58.2 | 30.9 | 2.4 | 8.5 |
| 0.2 | 0.5 | 58.7 | 31.1 | 3.0 | 7.2 |
| 0.2 | 0.6 | 59.2 | 31.4 | 3.7 | 5.8 |
| 0.2 | 0.7 | 59.7 | 31.7 | 4.3 | 4.4 |
| 0.2 | 0.8 | 60.2 | 31.9 | 5.0 | 2.9 |
| 0.2 | 0.9 | 60.7 | 32.2 | 5.6 | 1.5 |
| 0.2 | 1 | 61.2 | 32.5 | 6.3 | 0.0 |
| 0.3 | 0 | 49.8 | 39.6 | 0.0 | 10.6 |
| 0.3 | 0.1 | 50.1 | 39.8 | 0.5 | 9.6 |
| 0.3 | 0.2 | 50.4 | 40.1 | 0.9 | 8.6 |
| 0.3 | 0.3 | 50.7 | 40.3 | 1.4 | 7.6 |
| 0.3 | 0.4 | 51.0 | 40.6 | 1.8 | 6.5 |
| 0.3 | 0.5 | 51.3 | 40.9 | 2.3 | 5.5 |
| 0.3 | 0.6 | 51.7 | 41.1 | 2.8 | 4.4 |
| 0.3 | 0.7 | 52.0 | 41.4 | 3.3 | 3.3 |
| 0.3 | 0.8 | 52.3 | 41.6 | 3.8 | 2.2 |
| 0.3 | 0.9 | 52.7 | 41.9 | 4.3 | 1.1 |
| 0.3 | 1 | 53.0 | 42.2 | 4.8 | 0.0 |

| m | n | DGEBA wt % | T3000 wt % | XDA wt % | PDA wt % |
|---|---|---|---|---|---|
| 0.2 | 0 | 60.8 | 32.2 | 0.0 | 7.0 |
| 0.2 | 0.1 | 60.7 | 32.2 | 0.9 | 6.3 |
| 0.2 | 0.2 | 60.6 | 32.1 | 1.8 | 5.6 |
| 0.2 | 0.3 | 60.5 | 32.1 | 2.6 | 4.9 |
| 0.2 | 0.4 | 60.3 | 32.0 | 3.5 | 4.2 |
| 0.2 | 0.5 | 60.2 | 32.0 | 4.4 | 3.5 |
| 0.2 | 0.6 | 60.1 | 31.9 | 5.2 | 2.8 |
| 0.2 | 0.7 | 60.0 | 31.8 | 6.1 | 2.1 |
| 0.2 | 0.8 | 59.9 | 31.8 | 6.9 | 1.4 |
| 0.2 | 0.9 | 59.8 | 31.7 | 7.8 | 0.7 |
| 0.2 | 1 | 59.7 | 31.7 | 8.6 | 0.0 |

TABLE 1-continued

Formulations defined by n and m, with wt % of each reagent shown

| m | n | DGEBA wt % | T3000 wt % | XDA wt % | ABA wt % |
|---|---|---|---|---|---|
| 0.2 | 0 | 60.2 | 32.0 | 0.0 | 7.8 |
| 0.2 | 0.1 | 60.2 | 31.9 | 0.9 | 7.0 |
| 0.2 | 0.2 | 60.1 | 31.9 | 1.7 | 6.2 |
| 0.2 | 0.3 | 60.1 | 31.9 | 2.6 | 5.5 |
| 0.2 | 0.4 | 60.0 | 31.8 | 3.5 | 4.7 |
| 0.2 | 0.5 | 60.0 | 31.8 | 4.3 | 3.9 |
| 0.2 | 0.6 | 59.9 | 31.8 | 5.2 | 3.1 |
| 0.2 | 0.7 | 59.9 | 31.8 | 6.1 | 2.3 |
| 0.2 | 0.8 | 59.8 | 31.7 | 6.9 | 1.6 |
| 0.2 | 0.9 | 59.8 | 31.7 | 7.8 | 0.8 |
| 0.2 | 1 | 59.7 | 31.7 | 8.6 | 0.0 |

TABLE 2

Characteristic length scale $d_{x\text{-}link}$.

| Sample | $d_{x\text{-}link}$ (nm) |
|---|---|
| DGEBA-T3000 | 4.40 |
| DGEBA-TETA | 1.58 |
| DGEBA-D230 | 1.35 |
| DGEBA-ABA | 1.55 |
| DGEBA-PDA | 1.62 |
| DGEBA-XDA | 1.50 |

TABLE 3

Characteristic length scale $d_m$ for DGEBA-T3000-TETA-D230 networks.

| | $d_m$ (nm) | | | |
|---|---|---|---|---|
| n | m = 0.025 | m = 0.1 | m = 0.2 | m = 0.3 |
| 0 | 7.39 | 10.82 | 10.91 | 8.55 |
| 0.1 | 8.13 | 12.31 | 10.82 | 10.63 |
| 0.2 | 9.55 | 13.59 | 13.16 | 10.67 |
| 0.3 | 12.89 | 16.11 | 16.67 | 12.69 |
| 0.4 | 15.59 | 15.09 | 10.67 | 10.71 |
| 0.5 | 18.81 | 13.40 | 13.99 | 9.55 |
| 0.6 | 17.44 | 11.57 | 9.55 | 7.39 |
| 0.7 | 16.92 | 9.55 | 7.39 | 6.78 |
| 0.8 | 11.77 | 7.39 | 6.78 | 6.26 |
| 0.9 | 8.94 | 6.26 | 6.26 | 5.81 |
| 1 | 10.79 | 5.81 | 5.81 | 5.43 |

TABLE 4

Characteristic length scale $d_{x\text{-}link}$ for DGEBA-T3000-TETA-D230 networks.

| | $d_{x\text{-}link}$ (nm) | | | |
|---|---|---|---|---|
| n | m = 0.025 | m = 0.1 | m = 0.2 | m = 0.3 |
| 0 | 1.37 | 1.38 | 1.36 | |
| 0.1 | 1.40 | 1.41 | 1.42 | 1.40 |
| 0.2 | 1.43 | 1.44 | 1.44 | 1.46 |
| 0.3 | 1.46 | 1.46 | 1.46 | 1.46 |
| 0.4 | 1.48 | 1.50 | 1.48 | 1.51 |
| 0.5 | 1.53 | 1.54 | 1.53 | 1.53 |
| 0.6 | 1.58 | 1.55 | 1.54 | 1.54 |
| 0.7 | 1.58 | 1.60 | 1.58 | 1.57 |
| 0.8 | 1.62 | 1.63 | 1.58 | 1.57 |

TABLE 4-continued

Characteristic length scale $d_{x\text{-}link}$ for DGEBA-T3000-TETA-D230 networks.

| | $d_{x\text{-}link}$ (nm) | | | |
|---|---|---|---|---|
| n | m = 0.025 | m = 0.1 | m = 0.2 | m = 0.3 |
| 0.9 | 1.62 | 1.63 | 1.62 | 1.60 |
| 1 | 1.63 | 1.67 | 1.63 | 1.60 |

We claim:

1. A method of forming a thermoset, comprising:
   mixing a binary mixture of epoxy resins comprising a first epoxy resin and a second epoxy resin, wherein the first epoxy resin favors phase separation compared to the second epoxy resin and wherein a compositional parameter e of the binary mixture is equal to a fraction of the second epoxy resin in the binary mixture, an amine curing agent, and a rubber reactive with either the binary mixture of epoxy resins or the amine curing agent to provide a liquid mixture; and
   curing the liquid mixture, whereby the liquid mixture phase separates to form a thermoset with phase separated domains, wherein a domain size of the phase separated domains is continuously variable from less than 200 nm when e equals 1 to greater than 1 μm when e equals 0, and wherein e is selected to tune a domain size and composition of the phase separated domains.

2. The method of claim 1, wherein the size and composition of the phase separated domains determines a physical property of the thermoset, and wherein the physical property is a glass transition temperature, toughness, modulus, strength, fracture strain, impact and/or shock resistance, hardness, permeability, porosity, pore size, transparency, thermal expansion, or conductivity.

3. The method of claim 1, wherein the binary mixture of epoxy resins comprises a bisphenol A- or bisphenol F-based, aliphatic or cycloaliphatic, or novolac resin.

4. The method of claim 1, wherein the rubber comprises an amine-functionalized rubber that reacts with the binary mixture of epoxy resins.

5. The method of claim 4, wherein the amine-functionalized rubber comprises a polyether triamine based on a trifunctional polyoxypropylene backbone, amine-functionalized butadiene, nitrile, isoprene, chloroprene, styrene-butadiene, silicone, butyl, or ethylene-propylene-diene rubber.

6. The method of claim 1, wherein the amine curing agent comprises a polyether diamine based on a polyoxypropylene backbone, triethylenetetramine, m-phenylenediamine, 3-aminobenzylamine, or m-xylylenediamine.

7. The method of claim 1, wherein the first epoxy resin comprises diglycidyl ether of bisphenol A and the second epoxy resin comprises an epoxide-functionalized poly(propylene oxide).

8. The method of claim 1, wherein the rubber comprises polyether triamine or poly(ethylene glycol).

9. The method of claim 1, wherein the phase-separated domains comprise a rubber domain and an epoxy matrix domain.

10. A method of forming a thermoset, comprising:
    mixing an epoxy resin, a binary mixture of amine curing agents comprising a first amine curing agent and a second amine curing agent, wherein the second amine curing agent favors phase separation compared to the first amine curing agent and wherein a compositional parameter n of the binary mixture is equal to a fraction of the second amine curing agent in the binary mixture, and a rubber reactive with either the epoxy resin or the binary mixture of amine curing agents to provide a liquid mixture; and
    curing the liquid mixture, whereby the liquid mixture phase separates to form a thermoset with phase separated domains, wherein a domain size of the phase separated domains is continuously variable from less than 200 nm when n equals 0 to greater than 1 μm when n equals 1, and wherein n is selected to tune a domain size and composition of the phase separated domains.

11. The method of claim 10, wherein the size and composition of the phase separated domains determines a physical property of the thermoset and wherein the physical property is a glass transition temperature, toughness, modulus, strength, fracture strain, impact and/or shock resistance, hardness, permeability, porosity, pore size, transparency, thermal expansion, or conductivity.

12. The method of claim 10, wherein the first amine curing agent comprises a polyether diamine based on a polyoxypropylene backbone and the second amine curing agent comprises triethylenetetramine.

13. The method of claim 10, wherein the first amine curing agent comprises m-phenylenediamine and the second amine curing agent comprises m-xylylenediamine.

14. The method of claim 10, wherein the first amine curing agent comprises 3-aminobenzylamine and the second amine curing agent comprises m-xylylenediamine.

15. The method of claim 10, wherein the phase-separated domains comprise a rubber domain and an epoxy matrix domain.

16. A method of forming a thermoset, comprising:
    mixing an epoxy resin, an amine curing agent, and a binary mixture of rubbers comprising a first rubber and a second rubber, wherein the second rubber favors phase separation compared to the first rubber and wherein a compositional parameter R of the binary mixture is equal to a fraction of the second rubber in the binary mixture, wherein the first and second rubbers are reactive with either the epoxy resin or the amine curing agent to provide a liquid mixture; and
    curing the liquid mixture, whereby the liquid mixture phase separates to form a thermoset with phase separated domains, wherein a domain size of the phase separated domains is continuously variable from less than 200 nm when R equals 0 to greater than 1 μm when R equals 1, and wherein R is selected to tune a domain size and composition of the phase separated domains.

17. The method of claim 16, wherein the size and composition of the phase separated domains determines a physical property of the thermoset and wherein the physical property is a glass transition temperature, toughness, modulus, strength, fracture strain, impact and/or shock resistance, hardness, permeability, porosity, pore size, transparency, thermal expansion, or conductivity.

18. The method of claim 16, wherein the binary mixture of rubbers comprises at least one amine-functionalized rubber that reacts with the epoxy resin.

19. The method of claim 18, wherein the at least one amine-functionalized rubber comprises a polyether triamine based on a trifunctional polyoxypropylene backbone.

20. The method of claim 18, wherein the at least one amine-functionalized rubber comprises an amine-functionalized butadiene, nitrile, isoprene, chloroprene, styrene-butadiene, silicone, butyl, or ethylene-propylene-diene rubber.

21. The method of claim 16, wherein the first rubber comprises poly(ethylene glycol) and the second rubber comprises a polyetheramine based on a polyoxypropylene backbone.

22. The method of claim 16, wherein the phase-separated domains comprise a rubber domain and an epoxy matrix domain.

* * * * *